(12) United States Patent  
Burgess et al.

(10) Patent No.: US 8,690,119 B2  
(45) Date of Patent: Apr. 8, 2014

(54) LEAK-FREE RECIPROCATING STEMMED VALVE

(75) Inventors: Kevin Burgess, Sheridan, WY (US); Daniel E. Clawson, Fresno, CA (US); David Yakos, Bozeman, MT (US); Bryan Walthall, Bozeman, MT (US)

(73) Assignee: Big Horn Valve, Inc., Sheridan, WY (US)

( * ) Notice: Subject to any disclaimer, the term of this patent is extended or adjusted under 35 U.S.C. 154(b) by 426 days.

(21) Appl. No.: 13/161,821

(22) Filed: Jun. 16, 2011

(65) Prior Publication Data

US 2012/0319019 A1    Dec. 20, 2012

(51) Int. Cl.
*F16K 31/44* (2006.01)

(52) U.S. Cl.
USPC .............. 251/248; 251/65; 251/215; 475/149

(58) Field of Classification Search
USPC .................... 251/65, 248, 249, 250.5, 215; 475/149–157
See application file for complete search history.

(56) References Cited

U.S. PATENT DOCUMENTS

| | | | | |
|---|---|---|---|---|
| 1,784,094 A * | 12/1930 | Fletcher | ........................ | 251/229 |
| 2,674,903 A * | 4/1954 | Doster | ............................ | 74/508 |
| 3,908,959 A * | 9/1975 | Fichtner | .................... | 251/129.11 |
| 4,093,180 A * | 6/1978 | Strabala | ........................ | 251/248 |
| 4,114,851 A | 9/1978 | Shivak et al. | | |
| 4,296,912 A * | 10/1981 | Ruyak | .............................. | 251/65 |
| 4,346,728 A * | 8/1982 | Sulzer | ........................ | 137/243.6 |
| 4,382,578 A * | 5/1983 | Ruyak | .............................. | 251/65 |
| 4,671,486 A * | 6/1987 | Giannini | ........................ | 251/65 |
| 6,764,060 B2 | 7/2004 | Fukano et al. | | |
| 7,837,175 B2 * | 11/2010 | Stone et al. | .................... | 251/249 |
| 8,297,315 B2 * | 10/2012 | Esveldt | ...................... | 137/625.3 |
| 8,490,946 B2 * | 7/2013 | Burgess et al. | ............... | 251/248 |
| 8,496,228 B2 * | 7/2013 | Burgess et al. | ............... | 251/248 |
| 2003/0006389 A1 | 1/2003 | Fukano et al. | | |
| 2005/0151107 A1 | 7/2005 | Shu | | |
| 2008/0203346 A1 | 8/2008 | Shu | | |
| 2009/0194721 A1 | 8/2009 | Watanabe et al. | | |

* cited by examiner

*Primary Examiner* — John Bastianelli
*Assistant Examiner* — Andrew J Rost
(74) *Attorney, Agent, or Firm* — Antoinette M. Tease

(57) ABSTRACT

A valve assembly comprising an adapter plate assembly comprising an adapter plate, a bonnet with a center and a threaded shaft extending through the center of the bonnet; an actuation assembly comprising an outer enclosure and an outer magnetic cartridge that is magnetically coupled to an inner magnetic cartridge; and an inner valve assembly comprising an inner enclosure and a planetary gear subassembly comprising one or more planetary gears.

11 Claims, 27 Drawing Sheets

# LEAK-FREE RECIPROCATING STEMMED VALVE

BACKGROUND OF THE INVENTION

1. Field of the Invention

The present invention relates generally to the field of valves, and more specifically, to a reciprocating stemmed valve that incorporates a planetary gear system and prevents leakage of fluid to the atmosphere.

2. Description of the Related Art

A number of patent applications have been filed for valve actuators that mitigate stem leakage through the use of a magnetic interlock. These actuator chambers either enclose the dynamic seal that is present in every valve around the stem of the valves, or they eliminate the need for the seal entirely. This dynamic seal is known as a packing or mechanical seal. The magnetic interlock is employed to transmit force from outside of the actuator chamber to the inside, thus avoiding the penetration of the chamber wall by a mechanical stem actuator. Penetration of the chamber wall would nullify the purpose for the chamber in the first place—to enclose the dynamic seal around the stem and prevent leakage from the seal.

The problem with the various magnetic actuators proposed is that the amount of force transmitted by the magnets is not adequate to ensure the proper function of the valve. If an actuator is designed to provide adequate force to open and close the valve, the magnet coupling is so large as to make it impractical. Even with the use of modern rare-earth magnets such as Neodymium-Iron-Boron and Samarium-Cobalt, the ability to transmit adequate force to the valve stem is still difficult. The forces provided by the magnets are only a fraction (usually less than 20%) of the force that a mechanical stem actuator can provide. This does not give the valve operator the confidence that his valve can be opened or closed under situations where high force is required, such as high fluid pressure, dry seals, or debris in the fluid path.

Rather than increasing force by building ever larger magnetic couplings, the present invention incorporates a set of planetary gears to take the force supplied by the inner magnetic coupling and magnify it many times over through gear speed reduction (i.e., the use of reducing gears). For example, through the use of a planetary gear subassembly, the rotational movement supplied by the inner magnetic cartridge is reduced three-fold, while at the same time the force supplied by the inner magnetic cartridge is magnified three-fold. This means that by using a planetary gear assembly with a 3:1 ratio (i.e., the outer magnetic cartridge rotates three times for every one rotation of the internal thread ring), one can either gain three times as much force for the valve stem, or else the size of the magnetic coupling can be reduced by three times. The reduction in size is desirable because the magnetic coupling is the most expensive component of the actuator, and its size is generally proportional to its cost.

Through the incorporation of a planetary gear subassembly, the present invention provides a magnetically activated valve actuator that can be used in the harshest conditions. Magnetic actuation is no longer appropriate for light applications only. Rather, it is a robust alternative that provides force to the stem that is equivalent to that of dynamically sealed stemmed valves. This innovation is most needed in places like chemical plants, refineries, paint factories, paper mills, etc. where valves are the central workhorses of the plant itself.

In addition to increasing force and/or decreasing the size of the magnetic coupling, the present invention has the advantage of completely containing any leakage of fluids from the valve bonnet. The present invention is intended to be coupled to valves that are used in hazardous fluid or chemical applications, where stem leakage poses a pollution threat to the outside environment or a safety threat to personnel working nearby. At the very least, leakage from stem packings results in the loss of product, which can be costly. Fugitive emissions account for over 125,000 metric tones of lost product per year in the United States alone. Of this amount, the percentage of fugitive emissions that come from valve stems is estimated to be between 60% and 85%. [1, 2]

The threat posed to the environment by leaking valve stems is great, particularly when the product that is leaked is a fugitive emission, that is, a leaked or spilled product that cannot be collected back from the environment. An example of a fugitive emission would be methane leaking from a valve on a pipeline or in a refinery, in which case the methane immediately goes into the atmosphere and cannot be recaptured. Another example would be crude oil leakage from a valve on an offshore rig, where the oil is carried away by ocean currents and cannot be brought back.

Safety requirements are becoming more stringent with each passing year. Personnel who are required to work near hazardous chemicals—such as operators in a petrochemical plant—are subject to injury from leaking valve stems, especially from reciprocating stems where the hazardous material inside the valve is transported to the outside environment via the stem as it retracts from the valve body. For example, if the valve is handling chlorine, a leaking stem transports it to the outside environment, where it becomes hydrochloric acid when it reacts with moisture in the air. This acid corrodes the stem, which makes it even more difficult to seal as time goes by.

The above examples illustrate the need for leak-free valves. The magnetic actuator of the present invention, described more fully below, is capable of addressing this need by safely enclosing the dynamic (stem) seal of reciprocating stemmed valves.

BRIEF SUMMARY OF THE INVENTION

A valve assembly comprising: an adapter plate assembly comprising an adapter plate, a bonnet with a center and a threaded shaft extending through the center of the bonnet; an actuation assembly comprising an outer enclosure and an outer magnetic cartridge that is magnetically coupled to an inner magnetic cartridge; and an inner valve assembly comprising an inner enclosure and a planetary gear subassembly comprising one or more planetary gears; wherein the outer enclosure is secured to the adapter plate, and the adapter plate is secured to a valve body; wherein the valve comprises a plunger that is situated inside of the valve body; wherein one end of the threaded shaft comprises external threads, and the other end of the threaded shaft is coupled to the plunger; wherein the bonnet comprises a bonnet skirt that is situated on top of the valve body between the valve body and adapter plate; wherein the planetary gear subassembly comprises an inner ring that is fixedly attached to the inner magnetic cartridge and an interface disc that is fixedly attached to the inner enclosure, thereby causing the inner enclosure to rotate at a speed slower than that of the inner magnetic cartridge; and wherein the outer enclosure prevents any fluids from escaping from the valve.

In a preferred embodiment, the invention further comprises a retaining ring that holds the inner valve assembly in the outer enclosure. Preferably, the invention further comprises an internal thread ring that is secured to the inner enclosure inside of the inner enclosure and that is comprised of internal threads that engage with the external threads on the threaded shaft such that when the inner enclosure rotates, the internal thread ring rotates, thereby causing the threaded shaft to move reciprocally within the bonnet.

In a preferred embodiment, as the threaded shaft reciprocates, it causes the plunger to move reciprocally within the valve body, thereby opening and closing the valve. Preferably, spline ridges on the threaded shaft and spline grooves inside of the bonnet prevent the threaded shaft from rotating when the internal thread ring rotates.

In a preferred embodiment, there is an area on top of the threaded shaft between the inner enclosure and threaded shaft into which the threaded shaft moves, and the internal thread ring has a top surface with at least one channel that allows fluid to escape the area on top of the threaded shaft when the threaded shaft moves into that area. Preferably, the invention further comprises a back seat that surrounds the threaded shaft and holds packing and a piston spring inside of the bonnet and surrounding the threaded shaft.

In a preferred embodiment, the bonnet comprises at least one weep hole that allows fluid to flow from outside of the bonnet to inside of the bonnet, thereby compressing the piston spring. Preferably, the invention further comprises a pressure relief valve situated on the bonnet skirt that allows fluid to flow from above the bonnet skirt to below the bonnet skirt and into the valve body.

In a preferred embodiment, the actuation assembly comprises a motor, the invention further comprises a torsion spring having two ends, and the torsion spring is positioned between the inner and outer enclosures with one end of the torsion spring secured to the inner enclosure and the other end of the torsion spring secured to the outer enclosure, the torsion spring being pre-wound such that it causes the inner enclosure to rotate in the event of a power loss to the motor. Preferably, the invention further comprises a positive stop inner collar that is secured to the outer enclosure and a positive stop outer collar that is secured to the outer magnetic cartridge, the positive stop inner collar comprises external threads that engage with inner threads on the positive stop outer collar, thereby causing the positive stop outer collar to move up and down relative to the positive stop inner collar and the outer magnetic cartridge to move up and down relative to the outer enclosure as the outer magnetic cartridge rotates, the outer enclosure comprises a step, and the outer magnetic cartridge is prevented from rotating further when it comes into contact with the step on the outer enclosure.

REFERENCE NUMBERS

Figure 1:
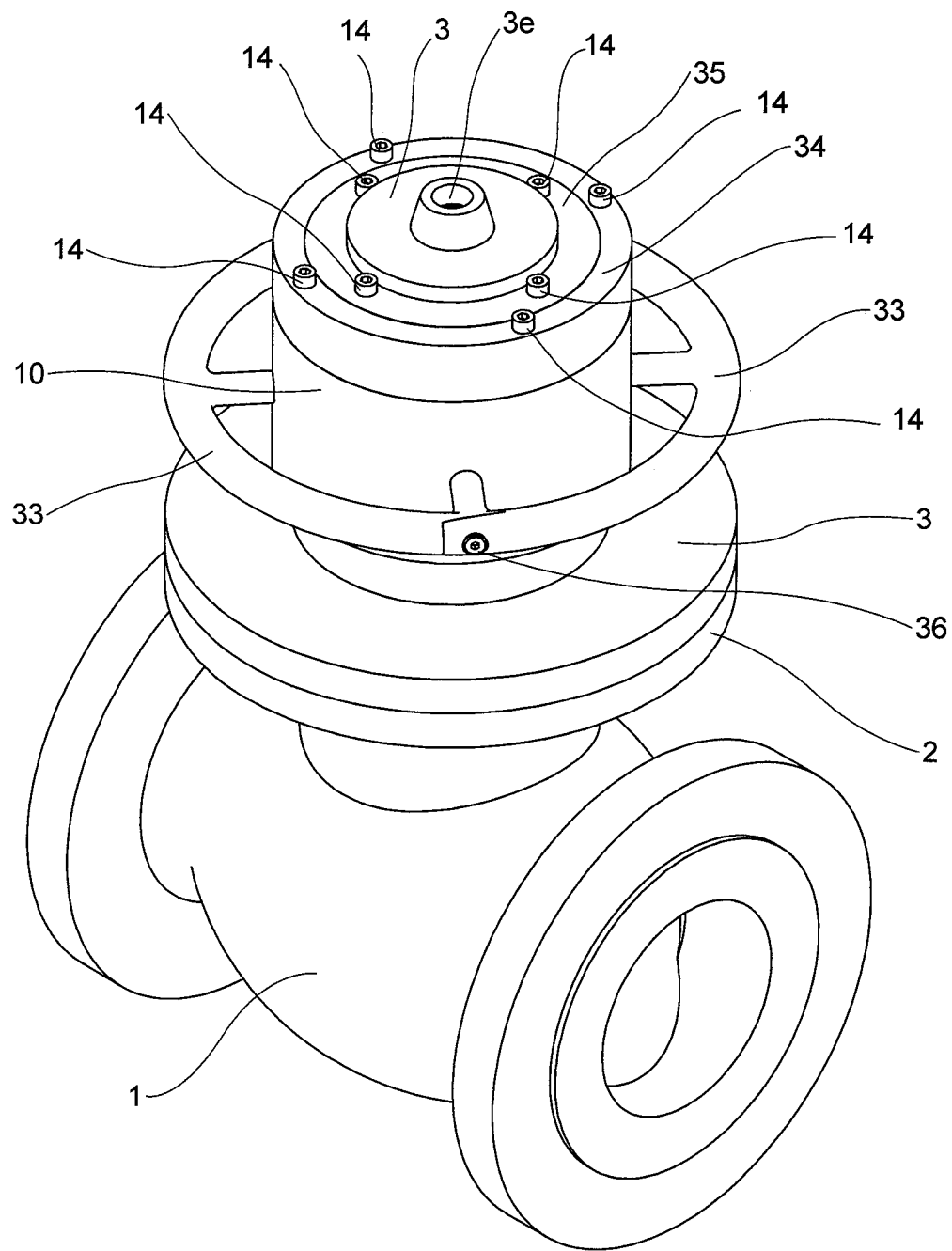
FIG. 1 is a perspective view of the present invention in a fully assembled state.

1 Valve body
2 Adapter plate
3 Outer enclosure
3a Key
3b Internal threads (on outer enclosure)
3c Gap
3d Step (of outer enclosure)
3e Sensor port
3f Slot (for torsion spring)
4 Inner enclosure
4a Outward protrusion (of inner enclosure)
4b Slot (for torsion spring)
5 Bonnet
5a Spline groove
5b Skirt (of bonnet)

5c Weep holes
6 Retaining ring
7 Inner magnet
8 Inner magnetic cartridge
9 Outer magnet
10 Outer magnetic cartridge
11 Plunger
12 Back seat
13a First thrust bearing
13b Second thrust bearing
13c Third thrust bearing
14 Screw
15 Packing
16 Outer ring
16a Slot
17 Circular bracket
19 Planetary gear
20 Interface disc
21 Inner ring/step-down gear
22 Rider ring
23 Grease fitting
25 Threaded shaft
25a External thread
25b Spline ridge
26 Internal thread ring
26a Internal threads (on internal thread ring)
26b Channel (on internal thread ring)
27a O-ring (dynamic seal)
27b O-ring (static seal)
27c O-ring (static seal)
29 Piston spring
30 Packing washer
31 Bushing
32 Pressure relief valve
33 Actuator wheel
34 Positive stop outer collar
35 Positive stop inner collar
36 Handle bolt
37 Planetary gear subassembly
38 Adapter plate assembly
39 Inner valve assembly
40 Actuator assembly
41 Stepper motor
42 Pneumatic clutch
43 Motor bracket
44 Outer gear
45 Torsion spring

DETAILED DESCRIPTION OF INVENTION

FIG. 1 is a perspective view of the present invention in a fully assembled state. This figure shows the valve body 1, adapter plate 2, and outer enclosure 3. It also shows the outer magnetic cartridge 10 and screws 14 that secure the positive stop outer collar 34 and positive stop inner collar 35 (see FIGS. 24 and 25) to the outer magnetic cartridge 10. An actuator wheel 33 is fixedly attached to the outer magnetic cartridge 10 with screws 36. To open and close the valve, the actuator wheel 33 is rotated manually. Because the actuator wheel 3 is fixedly attached to the outer magnetic cartridge 10, the outer magnetic cartridge 10 rotates with the actuator wheel 33.

Figure 2:
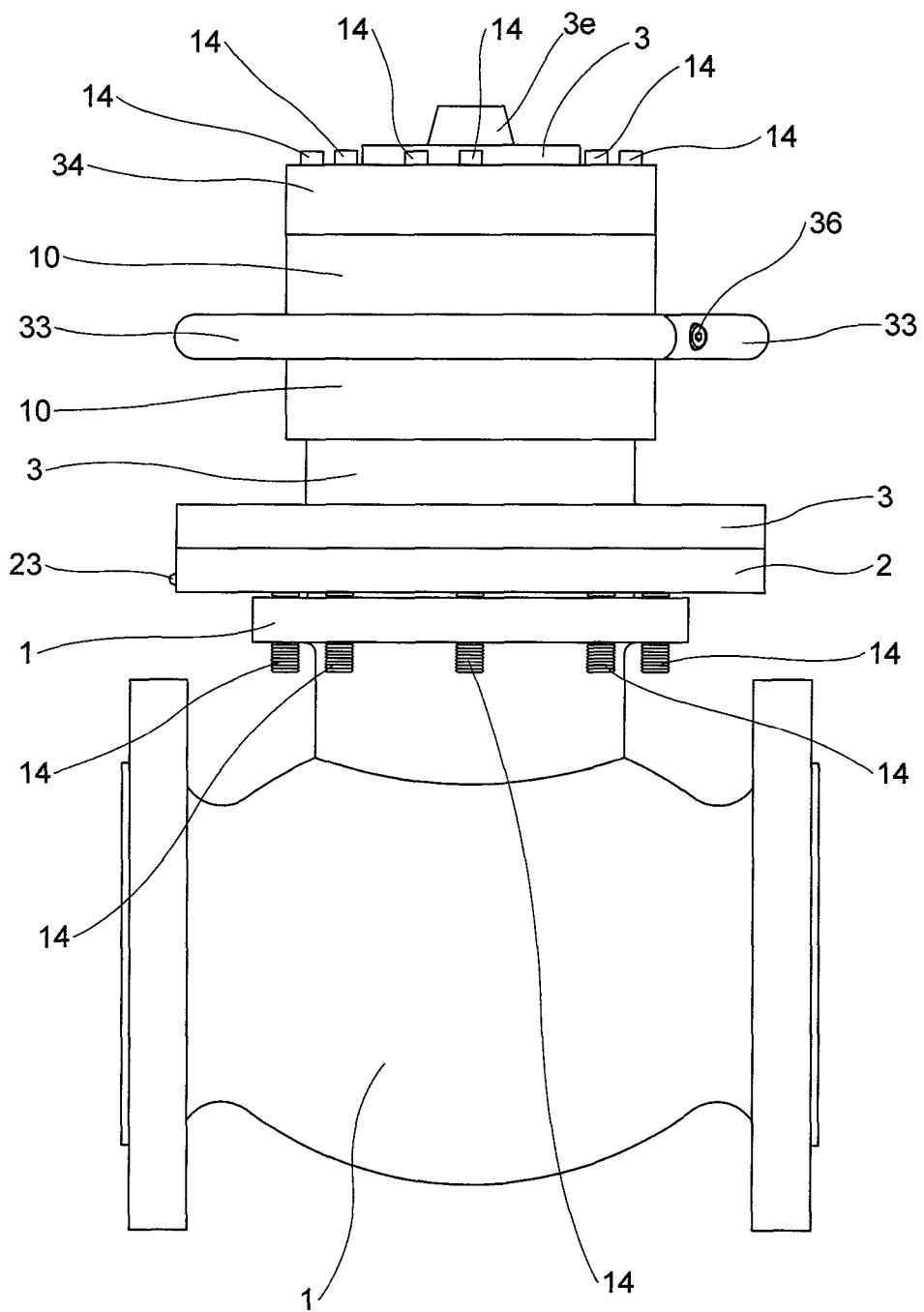
FIG. 2 is a side view of the present invention in a fully assembled state.

FIG. 2 is a side view of the present invention in a fully assembled state. This figure shows the valve body 1, adapter plate 2, and outer enclosure 3. The adapter plate 2 is used to secure the outer enclosure 3 to the valve body 1. In a preferred embodiment, the adapter plate 2 is sized and structured to fit an existing valve body 1; in this manner, the present invention may be used with any reciprocally-actuated stemmed valve. Thus, the present invention is not only a fully assembled valve but, in an alternate embodiment, a valve assembly comprising the adapter plate 2, outer enclosure 3, bonnet 5 and other structural features described below (but excluding the valve body 1).

FIG. 2 also shows the outer magnetic cartridge 10 and the screws 14 (also shown in FIG. 1) that secure the positive stop outer collar 34 and positive stop inner collar 35 (see FIGS. 24 and 25) to the outer magnetic cartridge 10. The two halves of the actuator wheel 33 are held together, and are also fixedly attached to the outer magnetic cartridge 10, by the handle bolts 36. The grease fitting 23 (see also FIGS. 4 and 30), which is preferably a one-way valve, is used to inject grease into the upper compartment during assembly or if additional grease is needed during the life of the valve. As used herein, the term "upper compartment" means the area inside the inner enclosure 4 between the inner enclosure 4 and the adapter plate 2/bonnet 5. As used herein, the term "lower compartment" means the area inside the valve body 1 below the adapter plate 2/bonnet 5.

Figure 3:
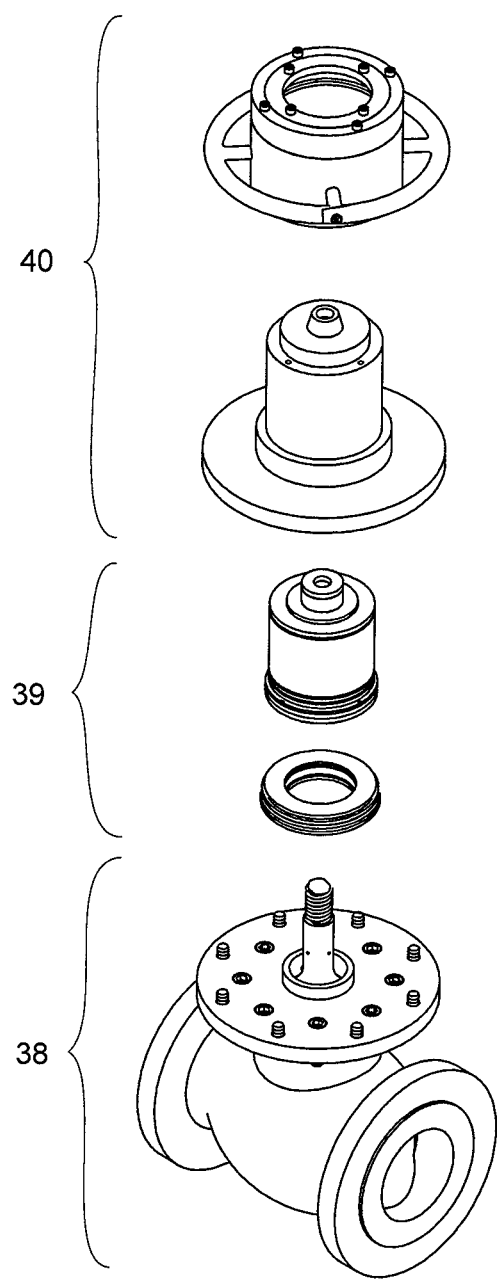
FIG. 3 is an exploded view of the present invention.
Figure 7:
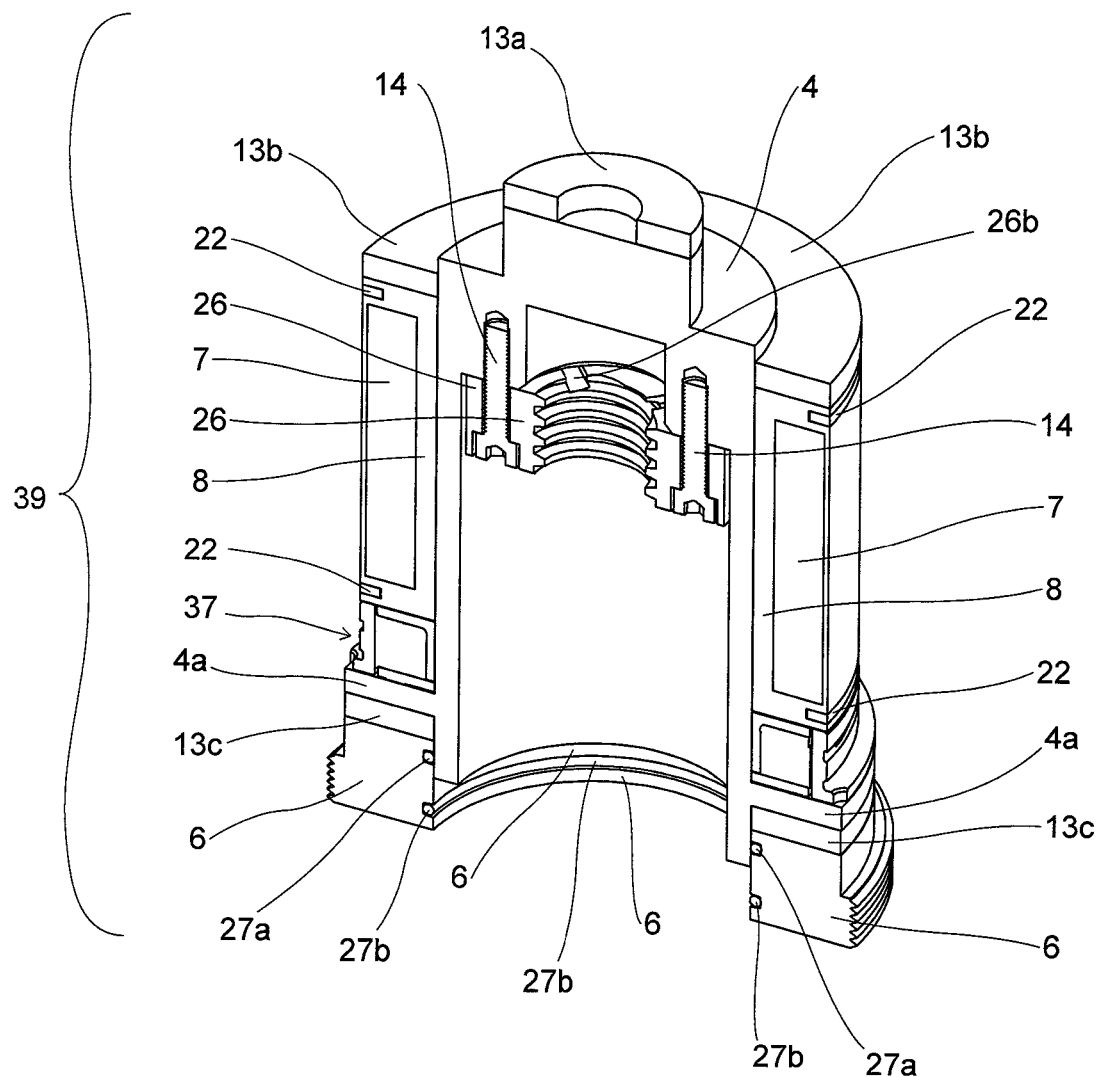
FIG. 7 is a section view of the inner valve assembly of the present invention.
Figure 8:
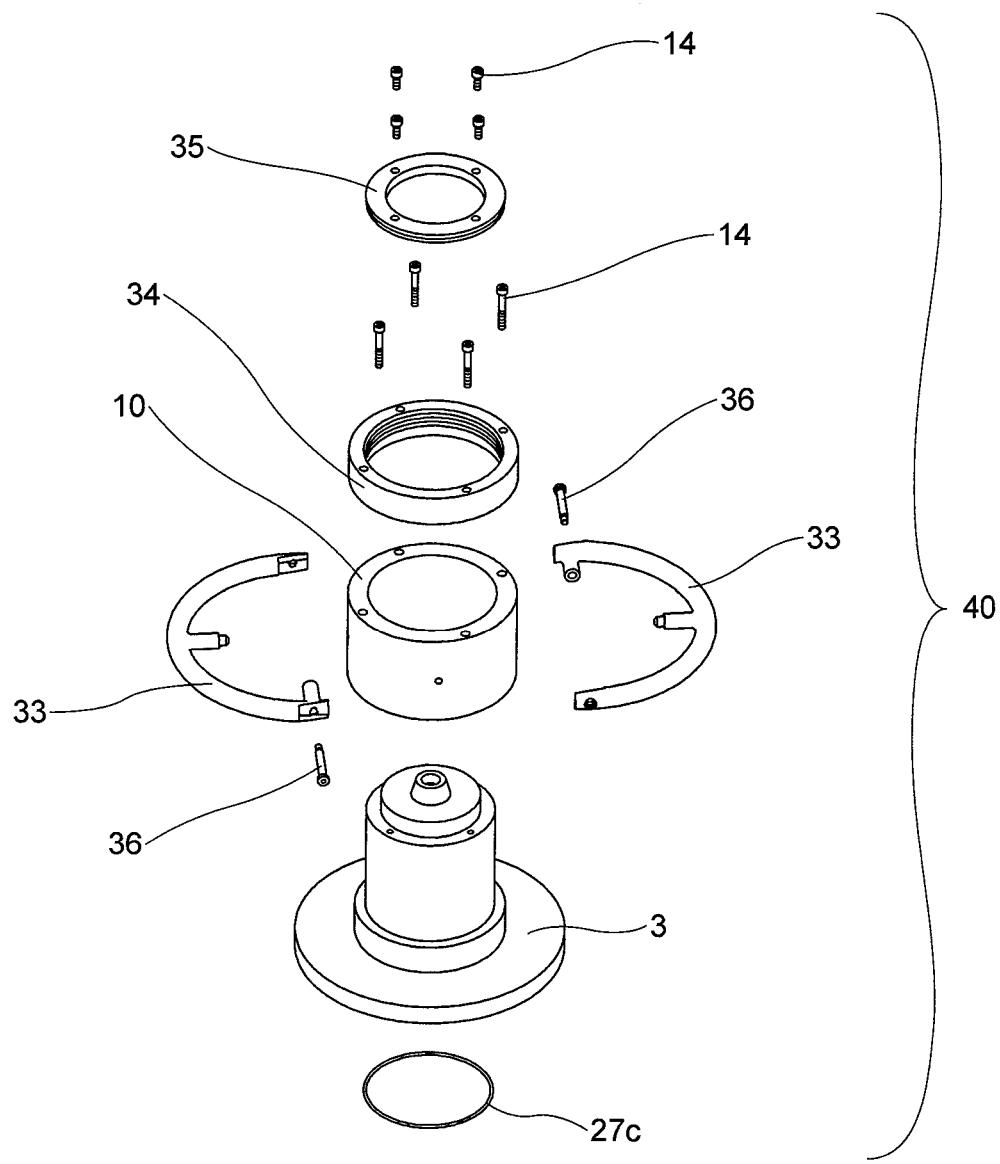
FIG. 8 is an exploded view of the actuator assembly of the present invention.
Figure 9:
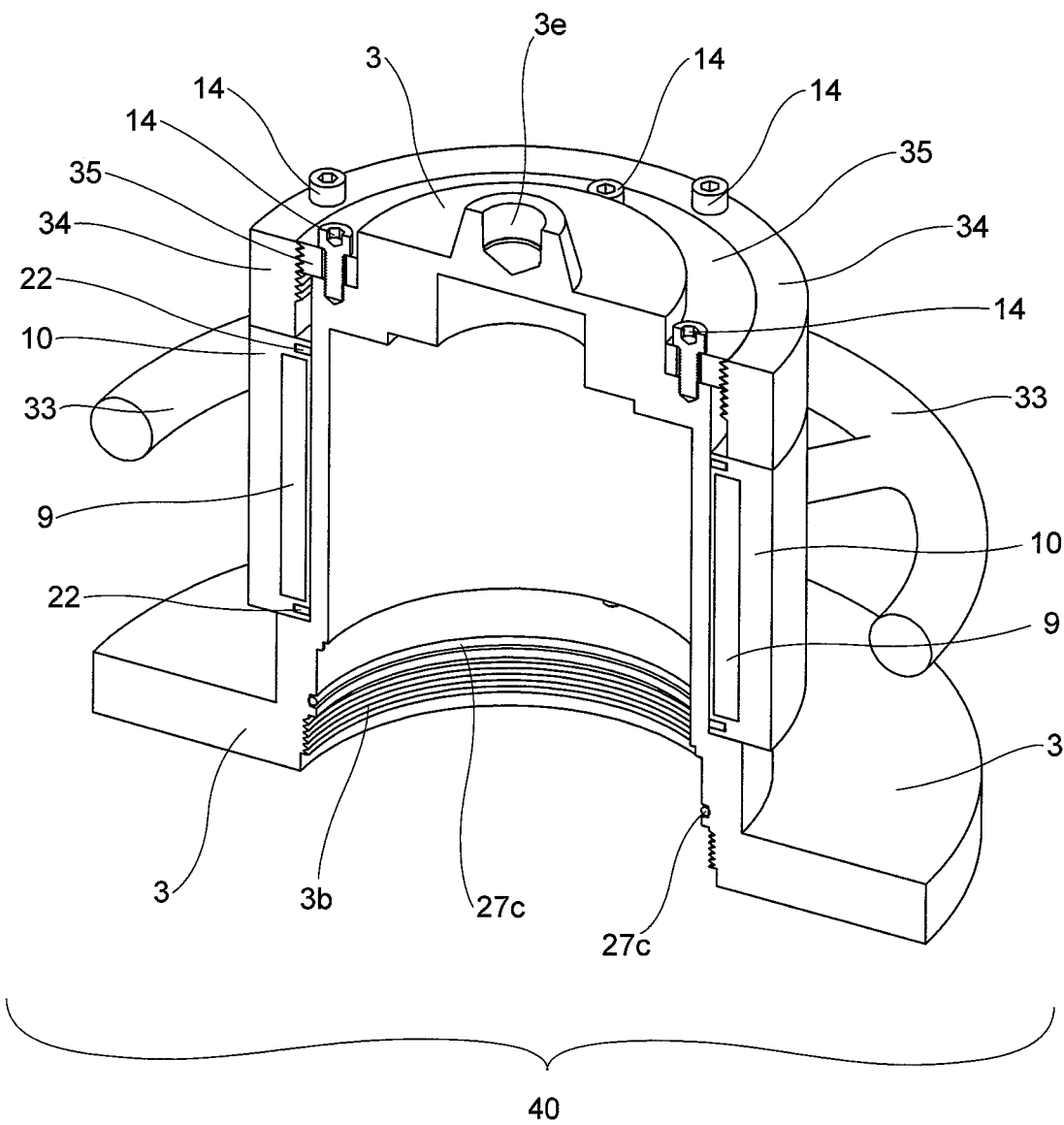
FIG. 9 is a section view of the actuator assembly of the present invention.

FIG. 3 is an exploded view of the present invention. This figure shows the adapter plate assembly 38, the inner valve assembly 39, and the actuator assembly 40. The details of the adapter plate assembly 38 are shown in FIGS. 4 and 5, the details of the inner components 39 are shown in FIGS. 6 and 7, and the details of the outer components 40 are shown in FIGS. 8 and 9.

Figure 4:
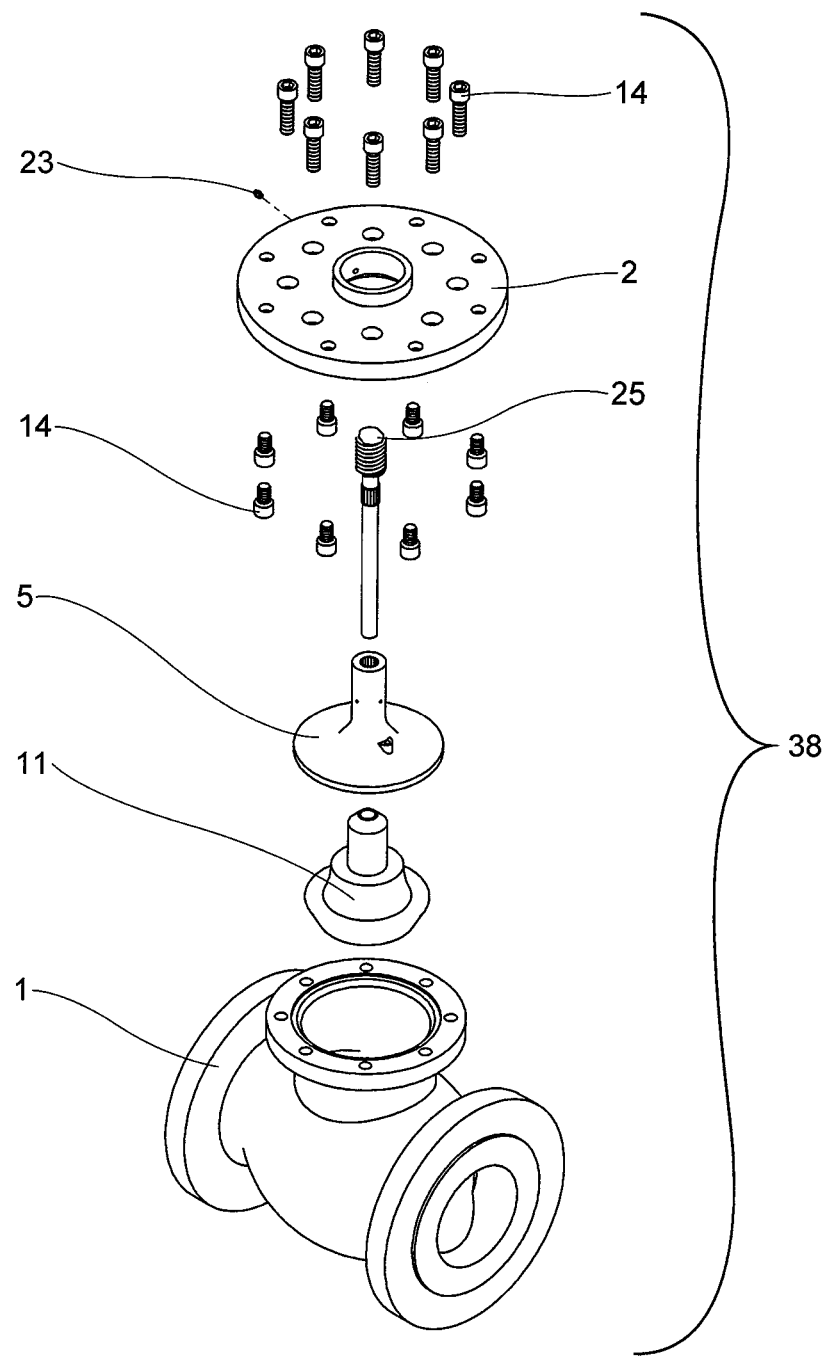
FIG. 4 is an exploded view of the adapter plate assembly of the present invention.

FIG. 4 is an exploded view of the adapter plate assembly of the present invention. As shown in this figure, the bonnet 5 fits over the plunger 11. In this case, the valve stem shown in FIG. 4 is a globe-style plunger, but the present invention will work with any stem-type valve. (As used in the claim, the term "plunger" means any form of reciprocating stem.) The plunger 11 sits inside of the valve body 1. The bonnet 5 lies on top of the valve body 1 between the valve body 1 and adapter plate 2. The adapter plate 2 is affixed to the top of the valve body 1 with screws 14. The lower set of screws 14 is used to attach the adapter plate 2 to the outer enclosure 3 (not shown). The threaded shaft 25 extends through the center of the bonnet 5; one end of the threaded shaft is threaded, and the other end of the threaded shaft is inserted into or otherwise coupled to the plunger 11.

Figure 5:
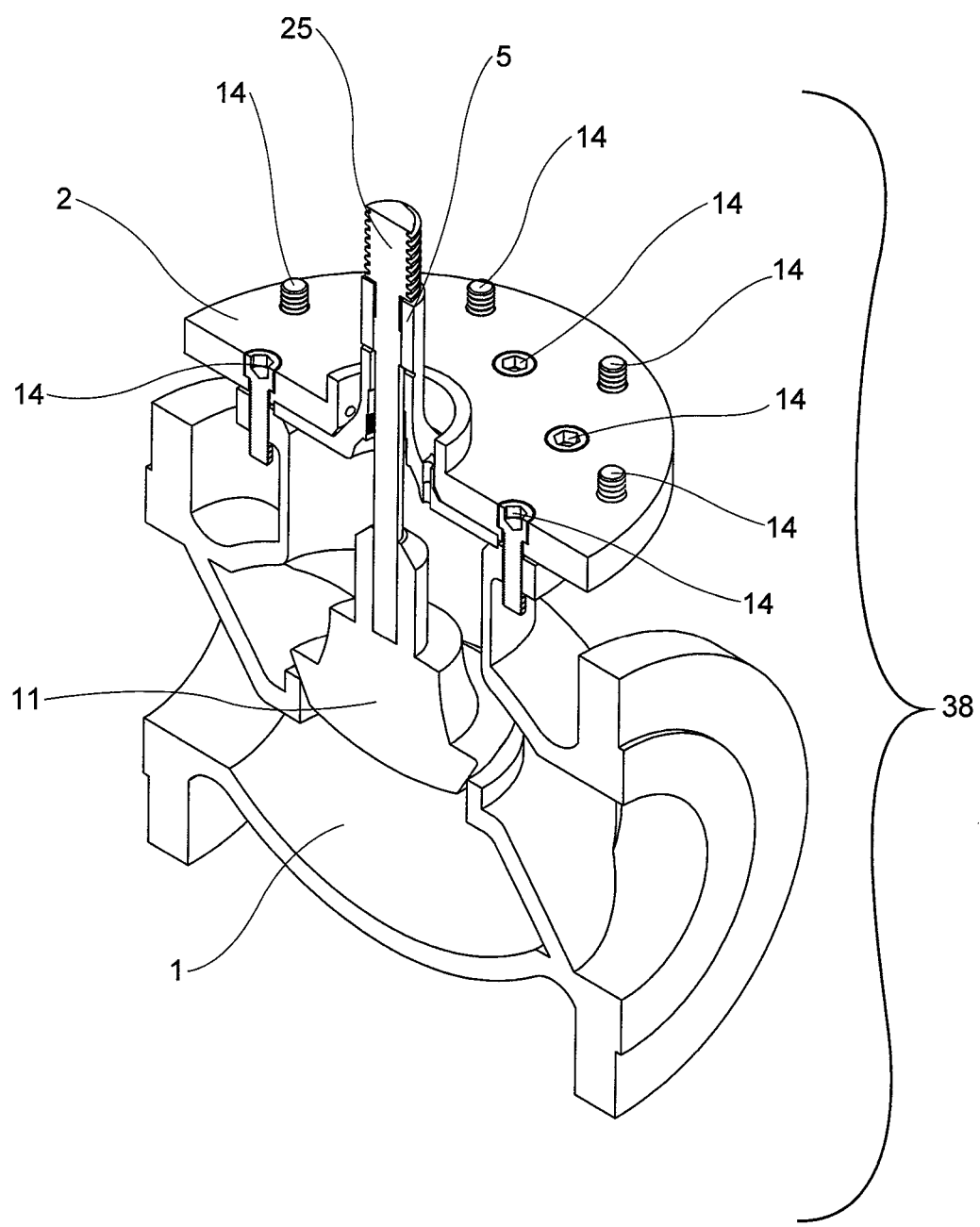
FIG. 5 is a section view of the adapter plate assembly of the present invention.

FIG. 5 is a section view of the adapter plate assembly of the present invention. In this figure, the adapter plate 2 is affixed to the valve body 1 (see also FIG. 2), and the threaded shaft 25 is shown extending down through the bonnet 5 and into the top of the plunger 11.

Figure 6:
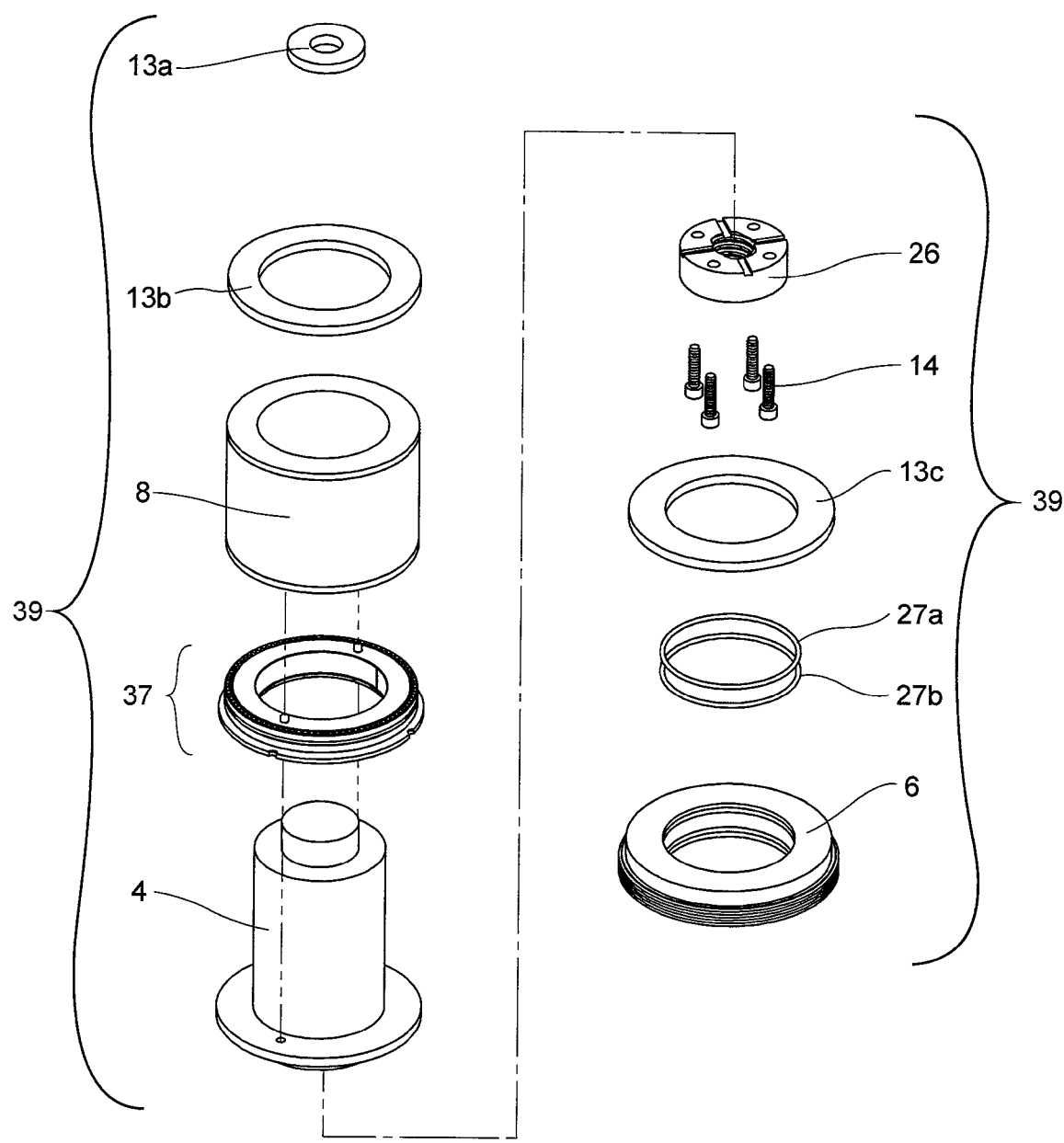
FIG. 6 is an exploded view of the inner valve assembly of the present invention.

FIG. 6 is an exploded view of the inner valve assembly of the present invention. This figure shows the inner enclosure 4, planetary gear subassembly 37, inner magnetic cartridge 8, and first, second and third thrust bearings 13a, 13b and 13c. The thrust bearings are situated between rotating components and stationary components and reduce friction between these components. The thrust bearings can be either a solid block of material with low-friction surfaces, or else they may contain ball bearings. FIG. 6 also shows the internal thread ring 26, screws 14 that secure the internal thread ring 26 to the inner enclosure 4, two O-rings 27a and 27b (see also FIG. 7) that sit in seats in the retaining ring 6, and the retaining ring 6. Note that the outer diameter of the outer ring 16 (see FIG. 13) of the planetary gear subassembly 37 is roughly the same as the outer diameter of the inner magnetic cartridge 8.

FIG. 7 is a section view of the inner valve assembly of the present invention. This figure shows the retaining ring 6, which is situated between the valve body 1 and the third thrust ring 13c. The retaining ring 6 holds the inner valve assembly 39 in the outer enclosure 3. The external threads of the retaining ring 6 engage with the internal threads 3b of the outer enclosure to hold the components in place. This figure also shows the O-ring 27a that functions as a dynamic seal between the retaining ring 6 and the inner enclosure 4 (see also FIG. 10). The O-ring 27b provides a static seal between the retaining ring and the adapter plate (not shown) (see also FIG. 10).

The inner magnetic cartridge 8 comprises a plurality of inner magnets 7. Two rider rings 22 provide a smooth surface for rotation against the inside surface of outer enclosure 3. The internal thread ring 26 lies directly underneath the top part of the inner enclosure 4 and is secured to the inner enclosure 4 with screws 14. Channels 26b on top of the thread ring 26 allow grease to escape the area on top of the threaded shaft 25 between the inner enclosure 4 and threaded shaft and flow into the upper compartment as the threaded shaft moves up into that area.

The planetary gear subassembly 37 is situated between an outward protrusion 4a of the inner enclosure 4 and the inner magnetic cartridge 8. In a preferred embodiment, the inner ring/step-down gear 21 of the planetary gear subassembly 37 is fixedly attached to the inner magnetic cartridge 8 such that the inner ring/step-down gear 21 of the planetary gear subassembly 37 rotates with the inner magnetic cartridge 8, and the interface disc 20 of the planetary gear subassembly 37 is fixedly attached to the outward protrusion 4a of the inner enclosure 4, thereby causing the inner enclosure to rotate with the interface disc 20 of the planetary gear subassembly 37.

FIG. 8 is an exploded view of the actuator assembly of the present invention. The actuator assembly 40 comprises the outer enclosure 3, outer magnetic cartridge 10, wheel actuator 33 and handle bolts 36, positive stop outer collar 34, and positive stop inner collar 35. Screws secure the positive stop inner collar 35 to the positive stop outer collar 34 and the positive stop outer collar 34 to the outer magnetic cartridge 10. An O-ring 27c provides a static seal between the outer enclosure 3 and the retaining ring 6.

FIG. 9 is a section view of the actuator assembly of the present invention. This figure shows the internal threads 3b at the bottom of the outer enclosure 3 that hold the retaining ring 6. It also shows the placement of the O-ring 27c inside of the outer enclosure 3; this O-ring 27c creates a static seal between the outer enclosure 3 and the retaining ring 6 when fully assembled. The outer magnets 9 are shown within the outer magnetic cartridge 10. The rider rings 22 keep the outer magnetic cartridge 10 in place and provide a smooth surface for rotation against the outer surface of the outer enclosure 3. An optional sensor port 3e on top of the outer enclosure 3 allows a sensor (not shown) to be attached to the outer enclosure 3 to monitor the distance to the top of the threaded shaft 25. (The sensor could be used with both the manual and the motorized actuation systems.) In the present invention, the outer enclosure 3 serves to capture fluids that may escape from the bonnet 5. The outer enclosure 3 is completely sealed to the outer atmosphere, thereby preventing any fluids from escaping from the valve.

Figure 10:
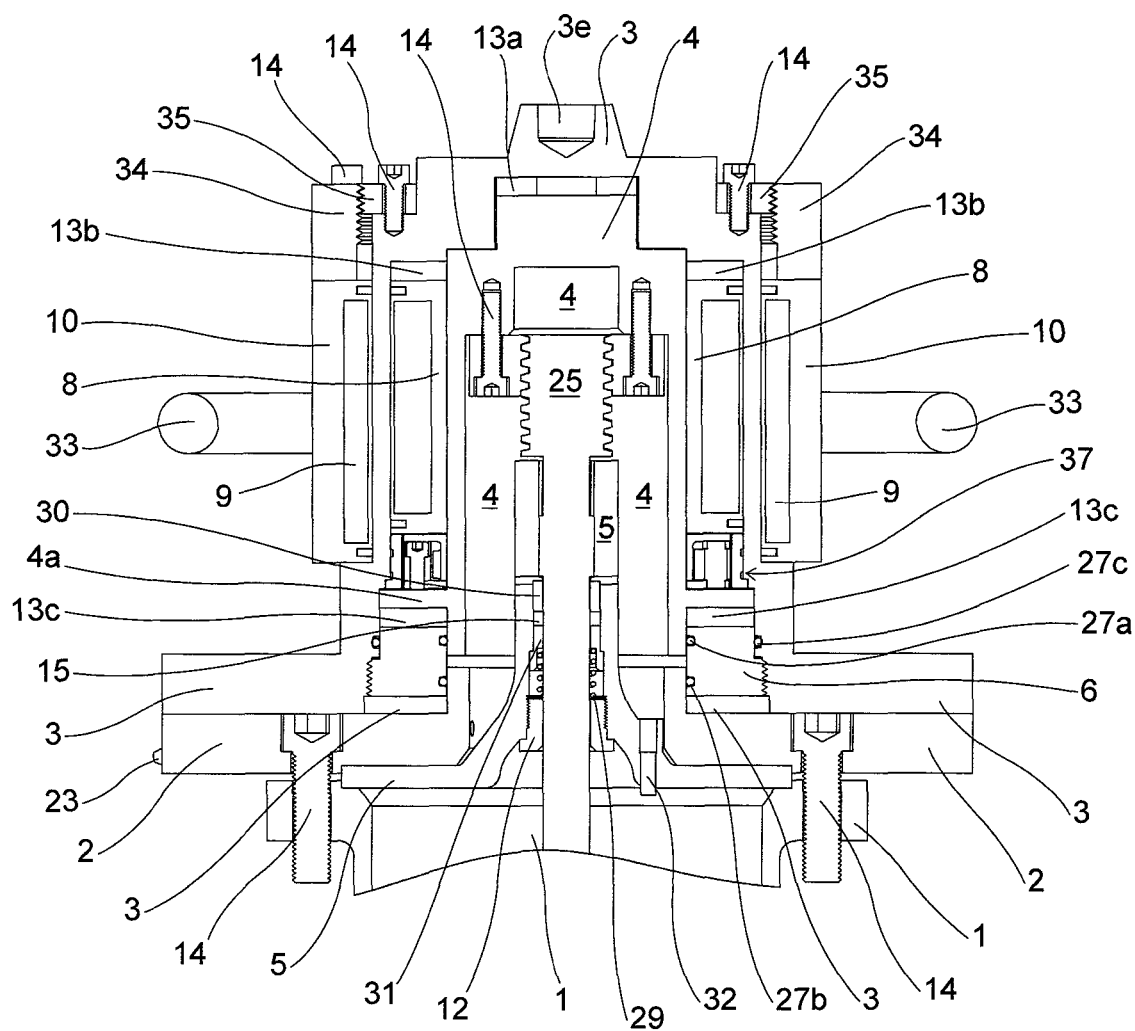
FIG. 10 is a cropped section view of the present invention in a fully assembled state.

FIG. 10 is a cropped section view of the present invention in a fully assembled state. This figure shows the inner valve assembly 39 in relation to the actuator assembly 40. In addition to the parts shown in previous figures, this figure shows the packing, which includes the packing washer 30, packing material 15 (by way of example, usually comprised of TEFLON®, graphite-impregnanted polyurethane material, or nylon rope), and bushing 31. The purpose of the packing is to minimize leakage of fluids from inside of the bonnet 5. As used in the claims, the term "packing" refers to any one of the packing washer, packing material and bushing, or any combination thereof.

This figure also shows the grease fitting 23, which attaches to the outside of the adapter plate 2 and provides an attachment point for grease to be added to the inner chamber. This figure also shows the back seat 12, which holds the packing washer 30, packing material 15, bushing 31 and piston spring 29 in place inside of the bonnet 5; each of these parts (packing washer 30, packing material 15, bushing 31 and piston spring 29) surrounds the threaded shaft 25. The purpose of the piston spring 29 is to allow the packing (reference numbers 15, 30 and 31) to act as a pressure equalization piston. As the valve is opened, the threaded shaft 25 moves upward in the upper compartment, thereby increasing the grease pressure. Weep holes 5c (see FIG. 19) in the bonnet 5 allow the pressurized grease to flow from the upper compartment and compress the piston spring 29. A pressure relief valve 32 provides a way for the grease to escape the upper compartment if the piston spring 29 fully compresses before the grease pressure is equalized with the fluid pressure in the valve body. This is a last resort to relieve pressure before the seals blow out or the outer enclosure cracks.

Figure 11:
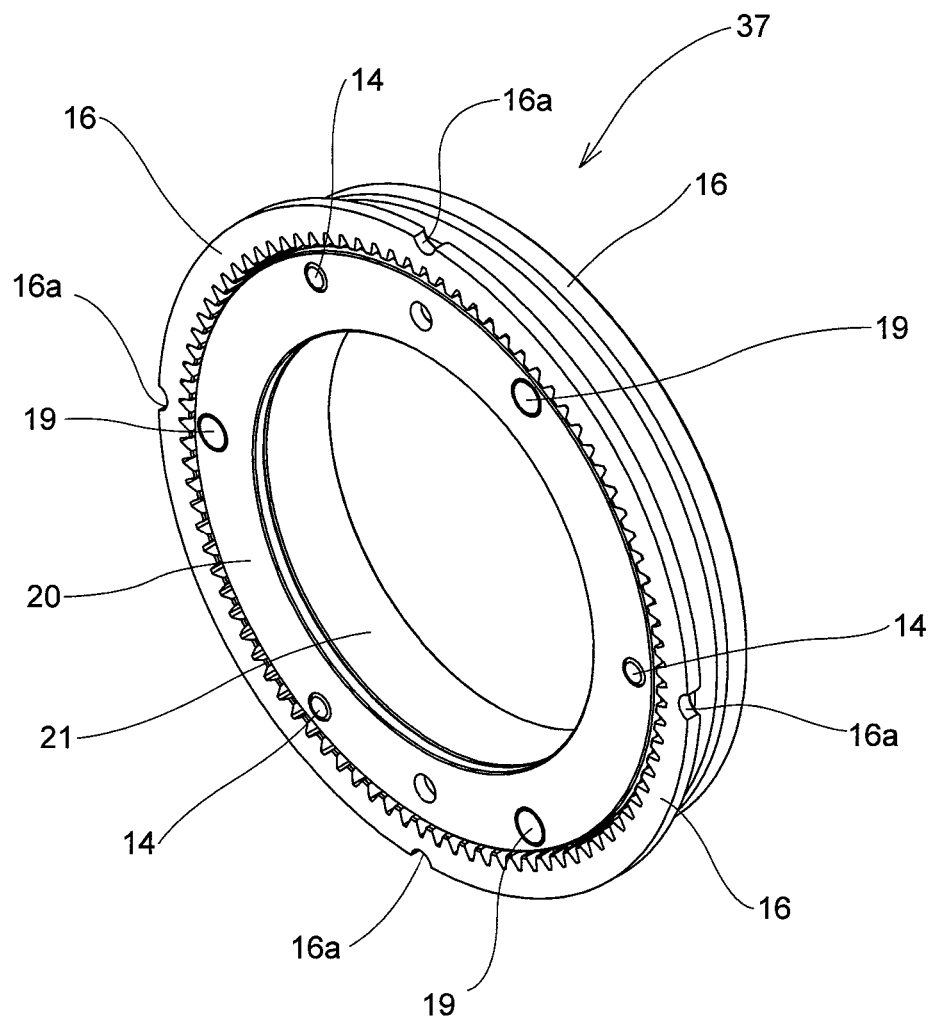
FIG. 11 is a perspective view of the planetary gear subassembly of the inner valve assembly of the present invention.

FIG. 11 is a perspective view of the planetary gear subassembly of the inner valve assembly of the present invention. As shown in this figure, the planetary gear subassembly 37 comprises an inner ring 21 (also called the "step-down gear"), an interface disc 20, and three planetary gears 19. Although three planetary gears 19 are shown in this embodiment, the present invention is not limited to any particular number of planetary gears. The planetary gear subassembly 37 further comprises an outer ring 16 with slots 16a in it; the purpose of these slots 16a is described in connection with FIGS. 22 and 23. Screws 14 secure the interface disc 20 to the circular bracket 17 (see FIG. 13).

Figure 12:
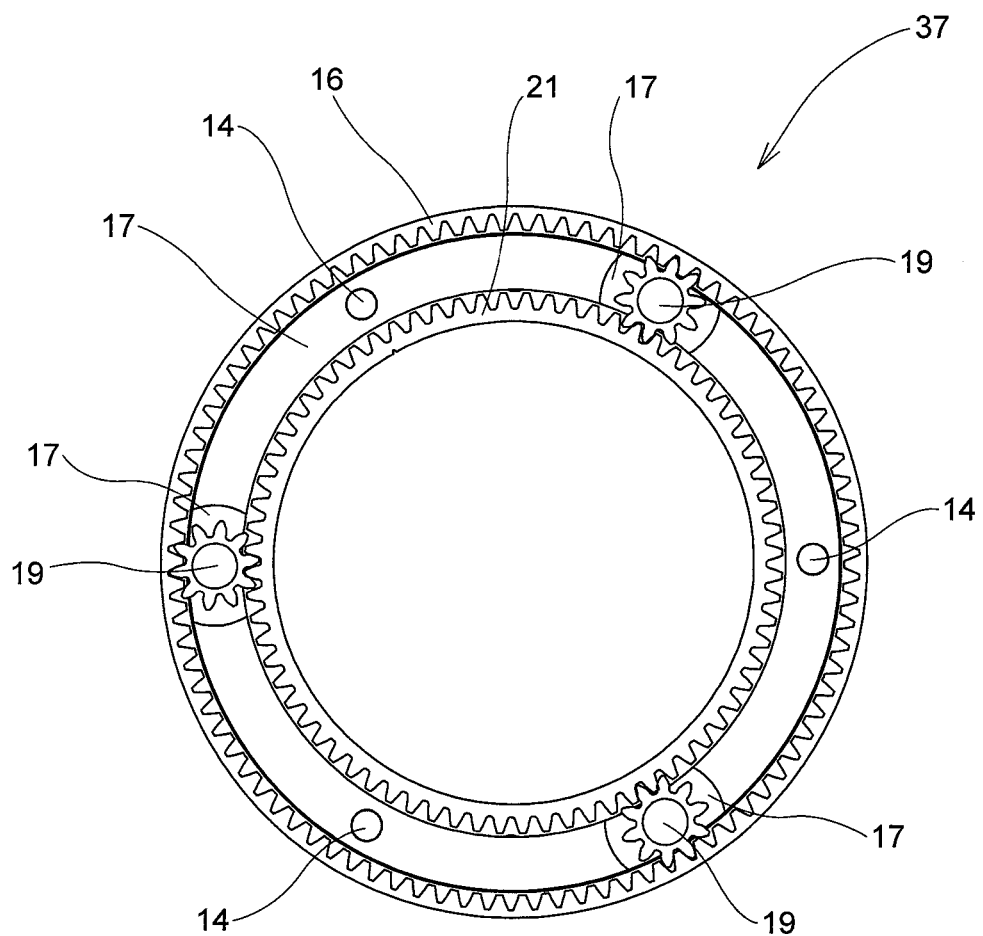
FIG. 12 is a side view of the planetary gear subassembly of the inner valve assembly of the present invention.

FIG. 12 is a side view of the planetary gear subassembly of the inner valve assembly of the present invention. This figure shows the planetary gears 19 in relation to the outer ring 16 and inner ring/step-down gear 21. It also shows the circular bracket 17 into which the planetary gears 19 are inserted (see FIG. 13). Screws 14 secure the circular bracket 17 to the interface disc 20 (see FIG. 13).

Figure 13:
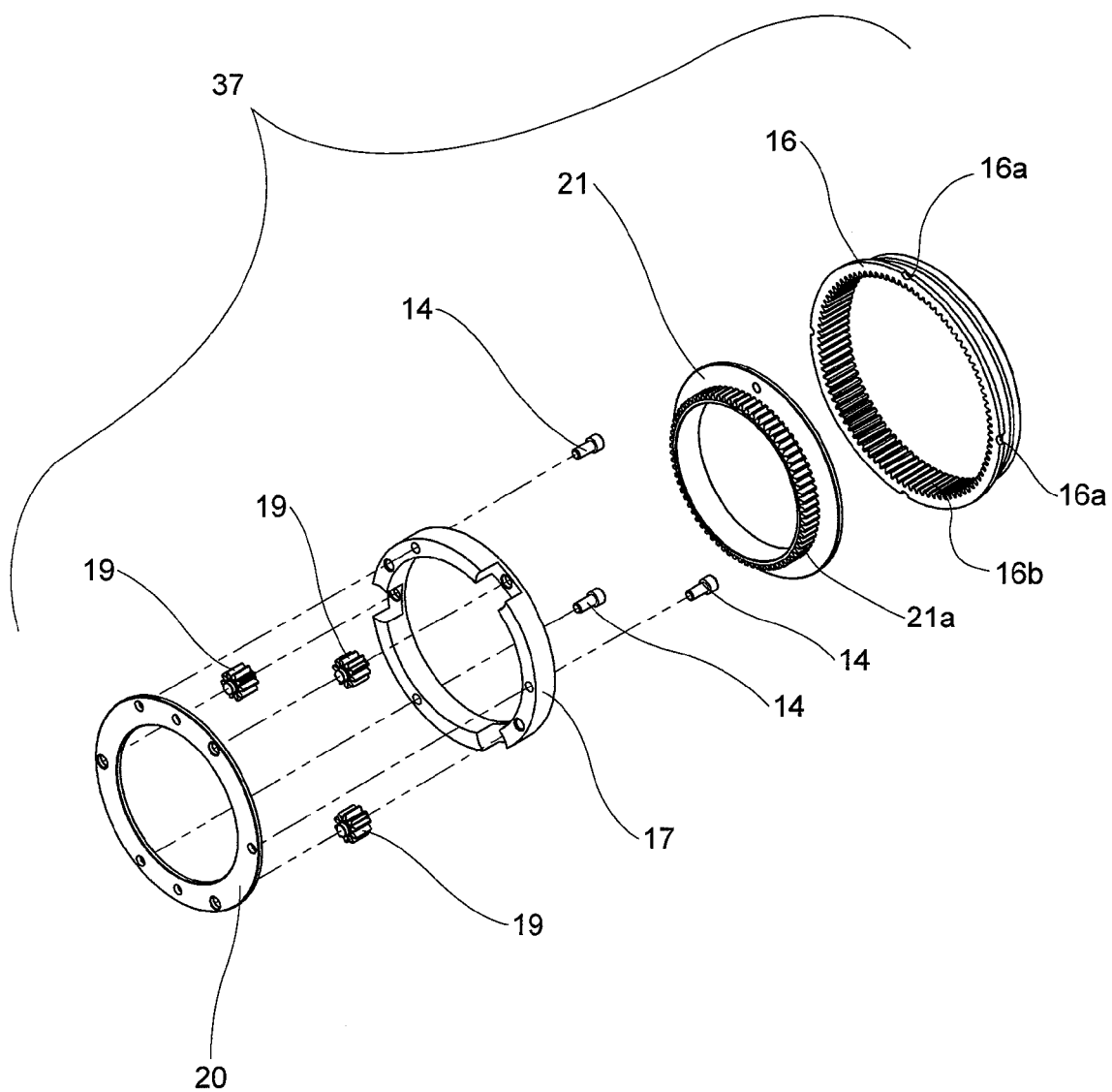
FIG. 13 is an exploded view of the planetary gear subassembly of the inner valve assembly of the present invention.

FIG. 13 is an exploded view of the planetary gear subassembly of the inner valve assembly of the present invention. This figure shows the outer ring 16, inner ring/step-down gear 21, circular bracket 17 and interface disc 20, as well as the planetary gears 19. As shown in this figure, the outer ring 16 has inner teeth 16b that extend around the inner perimeter of the outer ring 16. The inner ring/step-down gear 21 is attached to the inner magnetic cartridge 8 (not shown) and rotates with the inner magnetic cartridge 8. The interface disc 20 is attached with screws 14 to a circular bracket 17 into which the planetary gears 19 are inserted. As the inner ring/step-down gear 21 rotates, the planetary gears 19, which engage with both the teeth 16b on the inner perimeter of the outer ring 16 and the teeth 21a on the inner ring/step-down gear 21, "walk" around the inner ring/step-down gear 21, thereby causing the circular bracket 17 and interface disc 20 to rotate, albeit at a different (slower) speed than the inner ring/step-down gear 21. The interface disc 20 is fixedly attached to the inner enclosure 4 (see FIG. 6), thereby causing the inner enclosure 4 to rotate at the same speed as the interface disc 20. The outer ring 16 is fixedly attached to the outer enclosure 3 (see FIGS. 22 and 23) and does not rotate. Although the present invention is shown with only one planetary gear subassembly, more than one planetary gear subassembly may be used, depending on size and force requirements.

Figure 14:
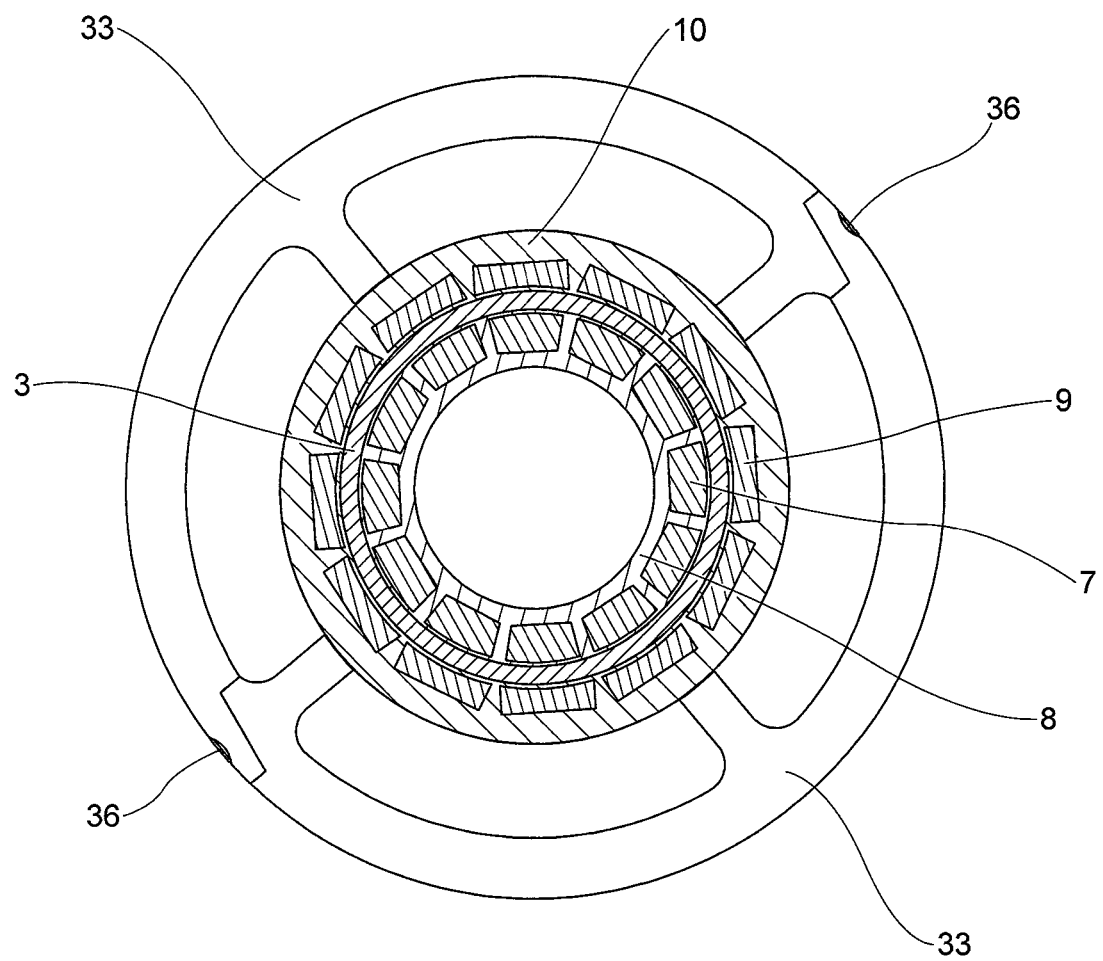
FIG. 14 is a section view of the handle, outer magnetic cartridge, outer enclosure and inner magnetic cartridge of the present invention.

FIG. 14 is a section view of the handle, outer magnetic cartridge, outer enclosure and inner magnetic cartridge of the present invention. This figure shows the actuator wheel 33, handle bolts 36, and outer and inner magnetic cartridge 10, 8. As shown here, the outer enclosure 3 lies between the outer and inner magnetic cartridges 10, 8. The outer magnetic cartridge 10 is comprised of a plurality of outer magnets 9, and the inner magnetic cartridge 8 is comprised of a plurality of inner magnets 7. As the actuator wheel 33 is turned, the outer magnetic cartridge 10 rotates, and the magnetic coupling between the outer and inner magnetic cartridges 10, 8 causes the inner magnetic cartridge 8 to rotate. As explained above, this rotation of the inner magnetic cartridge 8 in turn causes the inner ring/step-down gear 21 of the planetary gear subassembly 37 to rotate.

Figure 15:
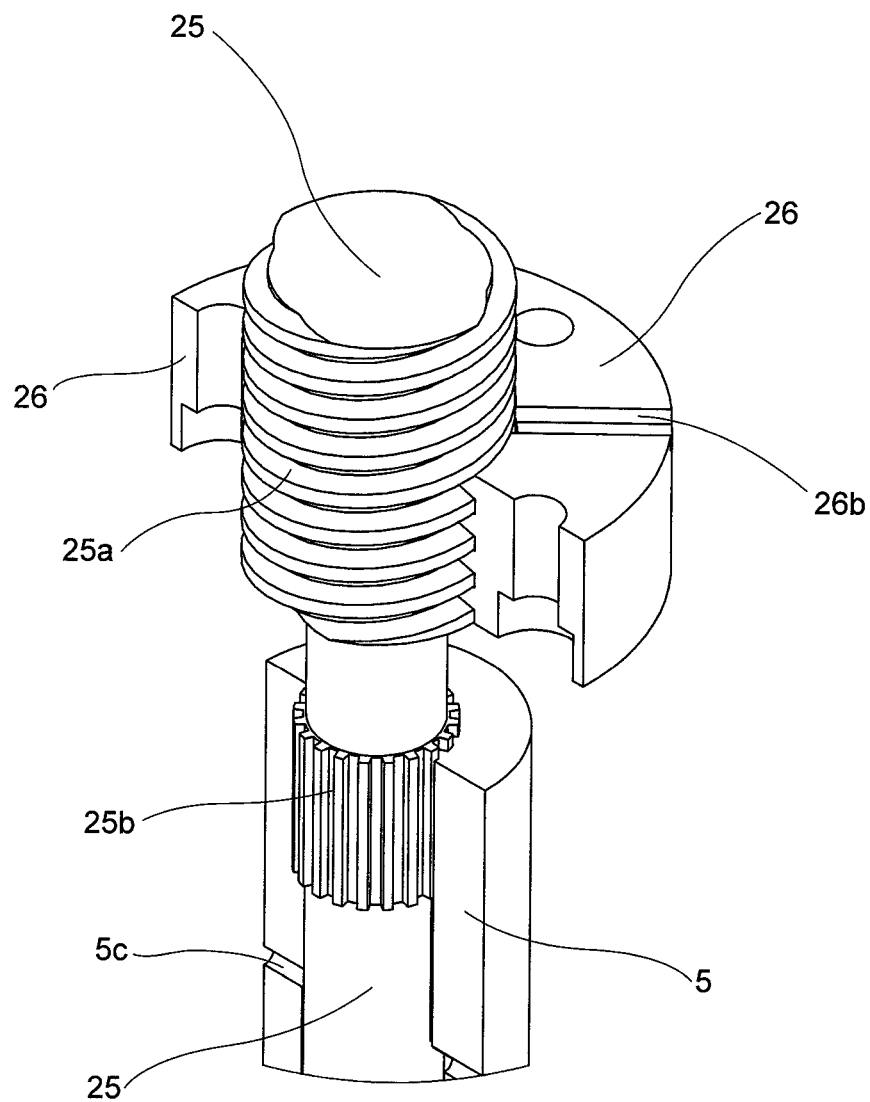
FIG. 15 is a detail perspective view of the threaded shaft, internal thread ring and bonnet of the present invention with the threaded shaft engaged with the internal thread ring.
Figure 16:
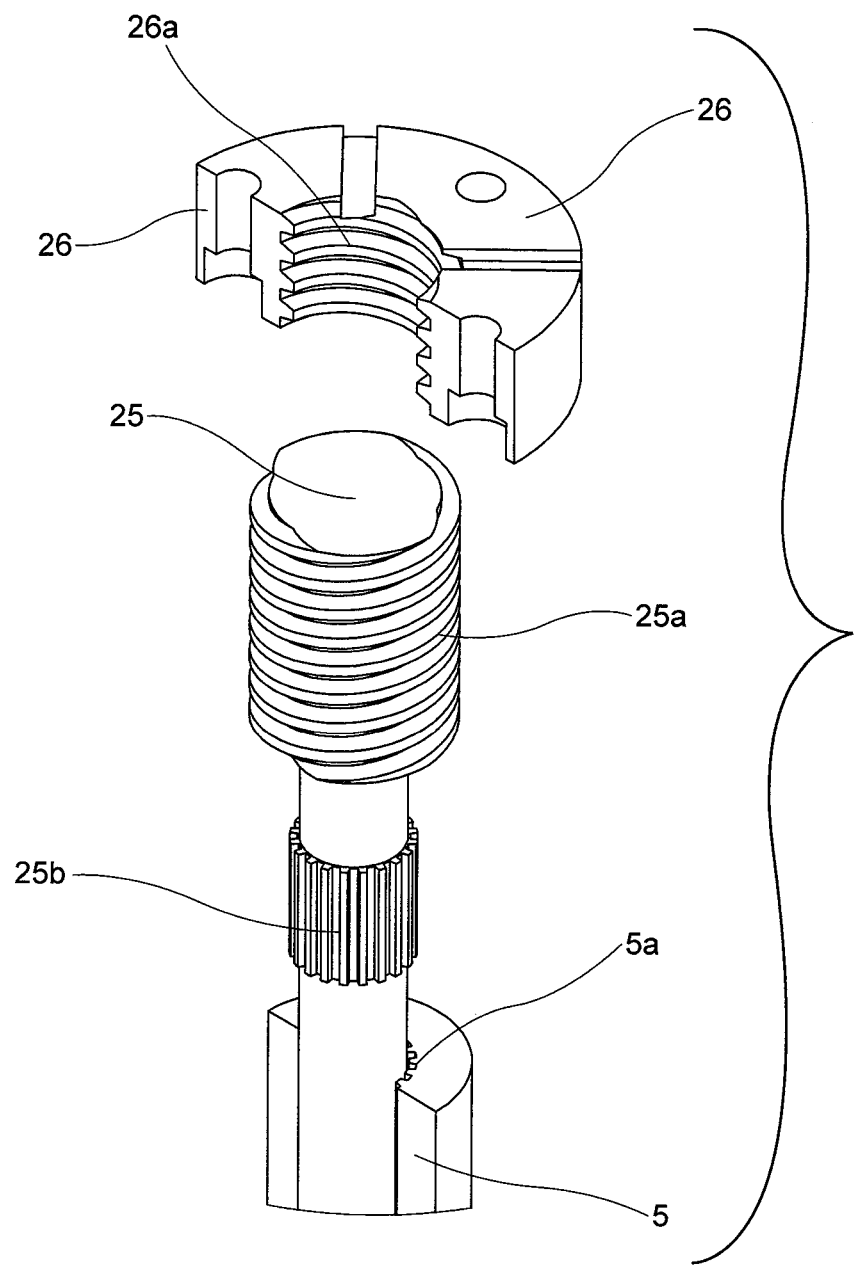
FIG. 16 is a detail perspective view of the threaded shaft, internal thread ring and bonnet of the present invention with the threaded shaft disengaged from the internal thread ring.

FIG. 15 is a detail perspective view of the threaded shaft, internal thread ring and bonnet of the present invention with the threaded shaft engaged with the internal thread ring. FIG. 16 is a detail perspective view of the threaded shaft, internal thread ring and bonnet of the present invention with the threaded shaft disengaged from the internal thread ring. The valve is shown in an open position in FIG. 15; however, in FIG. 16, the valve is neither in an open nor a closed position but disassembled for illustrative purposes. FIGS. 15 and 16 together illustrate the point at which the present invention converts rotational motion to reciprocal motion within the valve. As shown in FIG. 15, the top part of the threaded shaft 25 comprises external threads 25a, which engage with the internal threads 26a of the internal thread ring 26. The thread ring 26 is fixedly attached to the inner enclosure 4 with screws 14 (see FIG. 7) so that as the inner enclosure 4 rotates, the thread ring 26 also rotates.

As the thread ring 26 rotates, it causes the threaded shaft 25 to move up and down in relation to the threaded ring 26 by virtue of the fact that the external threads 25a of the threaded shaft 25 are engaged with the internal threads 26a of the threaded ring 26, and the spline ridges 25b keep the threaded shaft 25 from rotating. As the threaded shaft 25 moves up and down, it causes the plunger 11 (see FIG. 4), through which the threaded shaft 25 extends, to also move up and down, thereby opening and closing the valve (see FIGS. 17 and 18). The threaded shaft 25 also comprises spline ridges 25b located below the external threads 25a. These spline ridges 25b fit into spline grooves 5a on the inside of the bonnet 5. In this manner, the threaded shaft 25 is prevented from rotating as the internal thread ring 26 rotates and can only move up and down (i.e., reciprocally).

Figure 17:
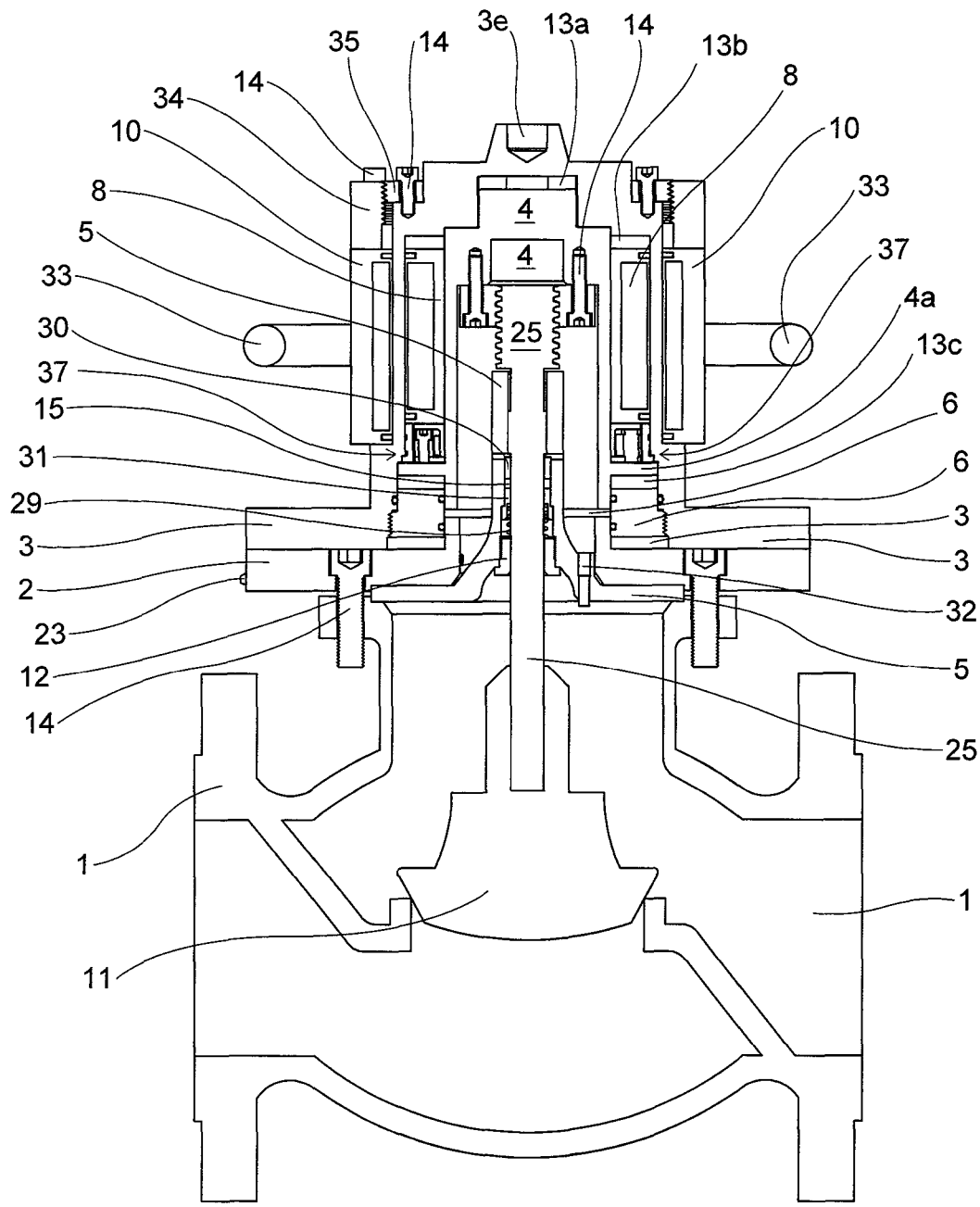
FIG. 17 is a section view of the present invention in a fully assembled state with the valve in a closed position.

FIG. 17 is a section view of the present invention in a fully assembled state with the valve in a closed position. This figure is similar to FIG. 10 except that it shows the valve body 1 and plunger 11. Note that the outer enclosure 3 fully encloses the bonnet 5 so that any fluids leaking from the bonnet 5 will remain enclosed within the outer enclosure 3. The outer enclosure 3 is screwed to the adapter plate 2, which in turn is screwed to the valve body 1 (see FIG. 3). Thus, the valve body 1, adapter plate 2 and outer enclosure 3 are fully sealed to the outside environment. Note that there is a slight gap (visible in FIGS. 2, 10, 17 and 18) between the valve body 1 and adapter plate 2; the purpose of this gap is to ensure that there is pressure on both sides of the bonnet skirt 5b when the valve is fully assembled.

Figure 18:
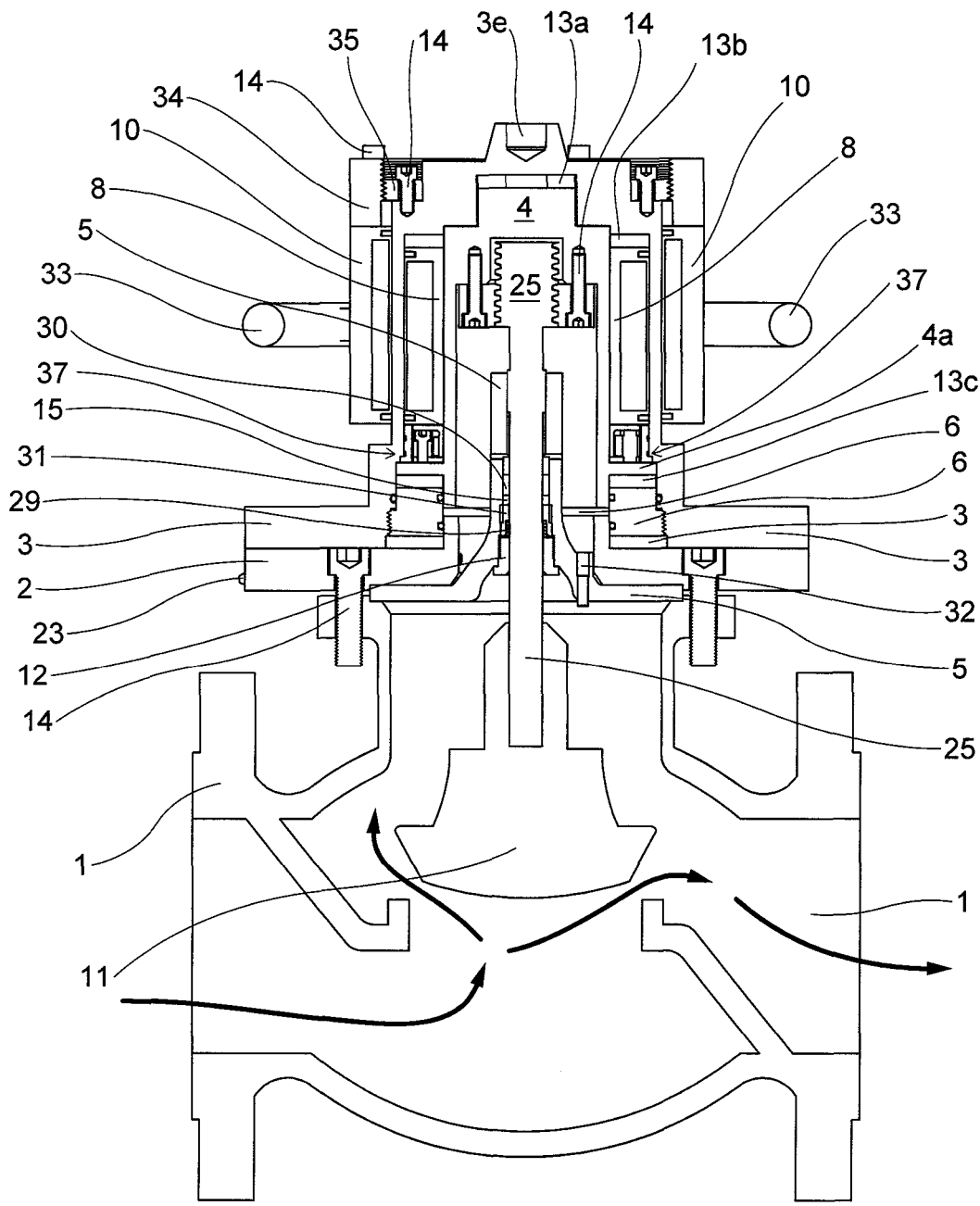
FIG. 18 is a section view of the present invention in a fully assembled state with the valve in an open position.

FIG. 18 is a section view of the present invention in a fully assembled state with the valve in an open position. By comparing FIG. 17 to FIG. 18, it will be clear that there is a space inside the inner enclosure 4 directly above the top of the threaded shaft 25; this space allows the threaded shaft 25 to move up and down, thereby pulling or pushing the plunger 11 up and down, as described in connection with FIGS. 15 and 16. The flow path of the valve is indicated with arrows in FIG. 18.

Figure 19:
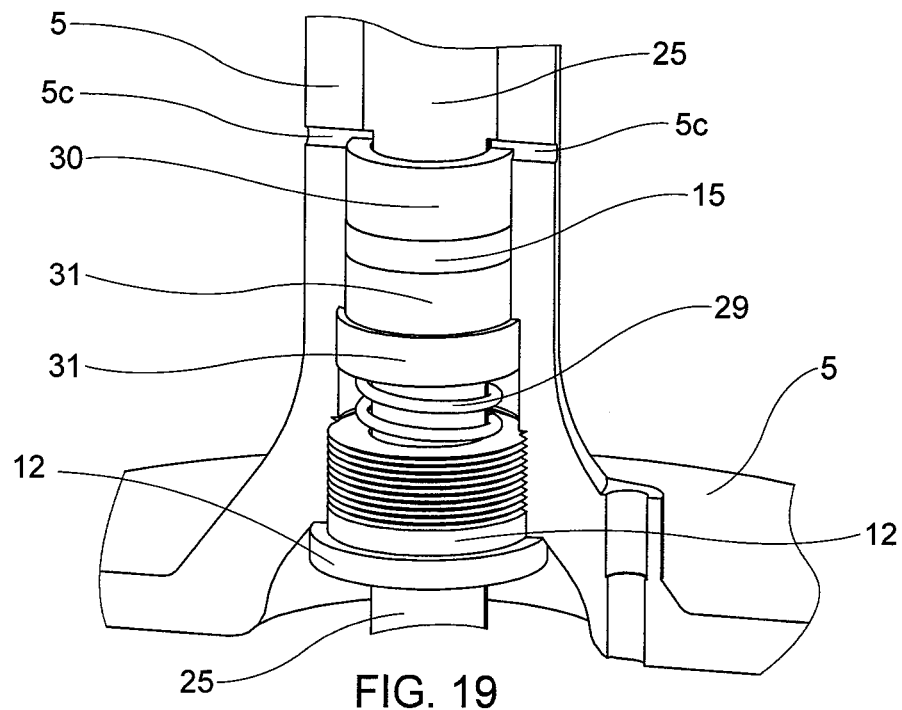
FIG. 19 is a detail view of the inside of the bonnet showing the piston spring with the valve in a closed position.
Figure 20:
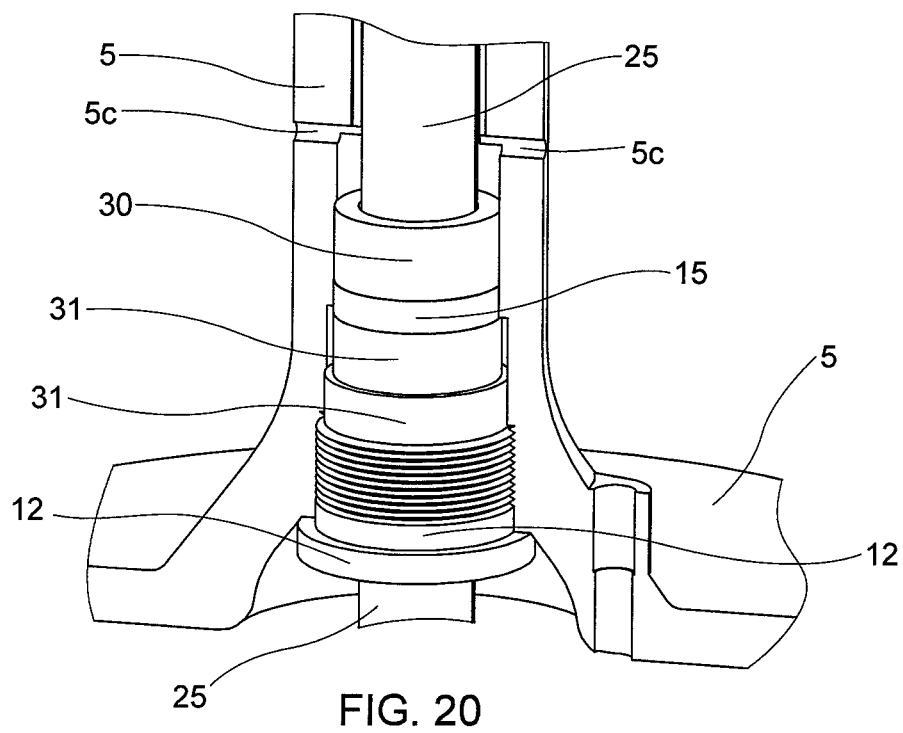
FIG. 20 is a detail view of the inside of the bonnet showing the piston spring with the valve in an open position.

FIG. 19 is a detail view of the inside of the bonnet showing the piston spring with the valve in a closed position, and FIG. 20 is a detail view of the inside of the bonnet showing the piston spring with the valve in an open position. These two figures show the piston spring 29 that extends around the threaded shaft 25 and is situated between the bushing 31 and the back seat 12. The purpose of the piston spring 29 is described above in connection with FIG. 10. Note that the piston spring 29 may be used with the manual or motorized actuation system.

Figure 21:
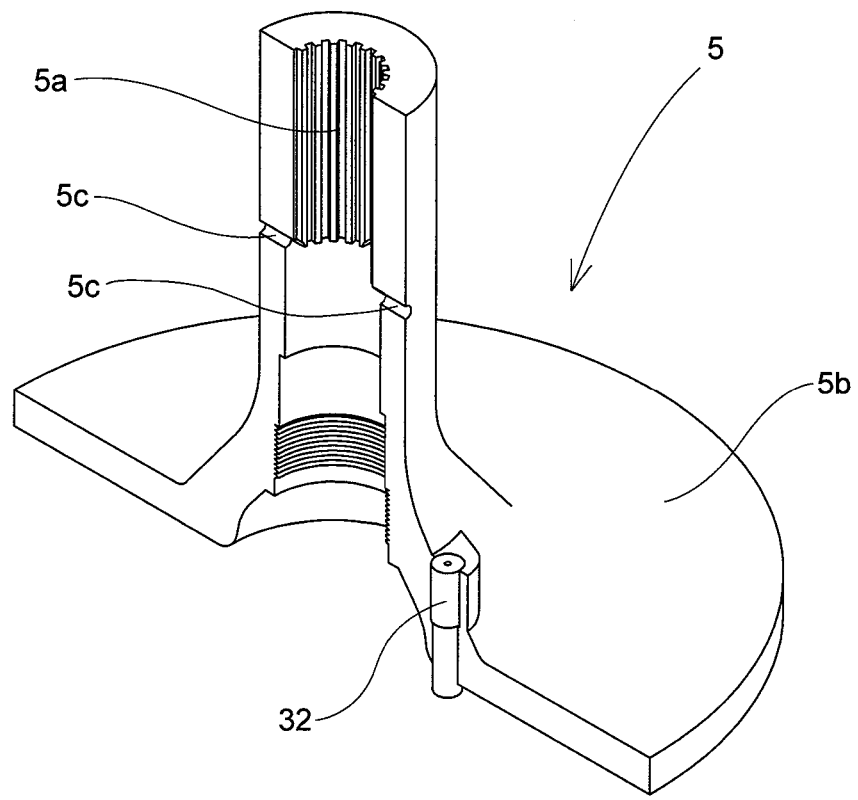
FIG. 21 is a detail view of the inside of the bonnet showing the pressure relief valve.

FIG. 21 is a detail view of the inside of the bonnet showing the pressure relief valve. The pressure relief valve 32 is preferably situated on the skirt 5b of the bonnet 5 with one end of the pressure relief valve 32 extending into the upper compartment and the other end of the pressure relief valve 32 extending into the lower compartment. The purpose of the pressure relief valve 32 is to release fluid from the upper (above the bonnet skirt) compartment into the lower (below the bonnet skirt) compartment in the case of catastrophic pressure in the upper compartment; for example, injection of grease through the grease fitting 23 may cause over-pressurization, or the piston spring 29 may fully compress before the valve is in a completely open position.

Figure 22:
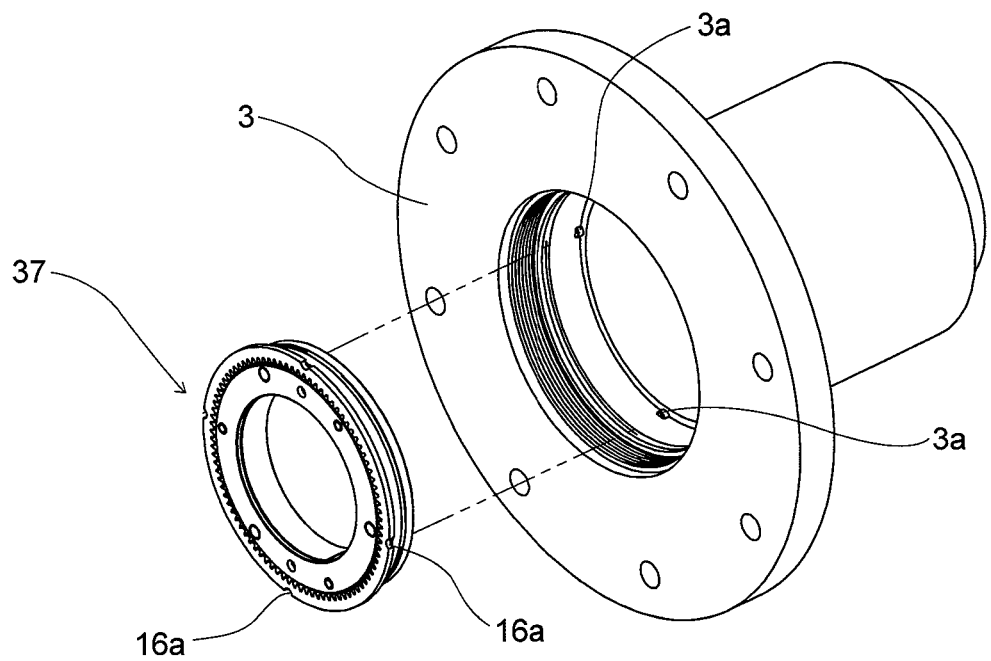
FIG. 22 is an exploded view of the planetary gear subassembly in relation to the outer enclosure.
Figure 23:
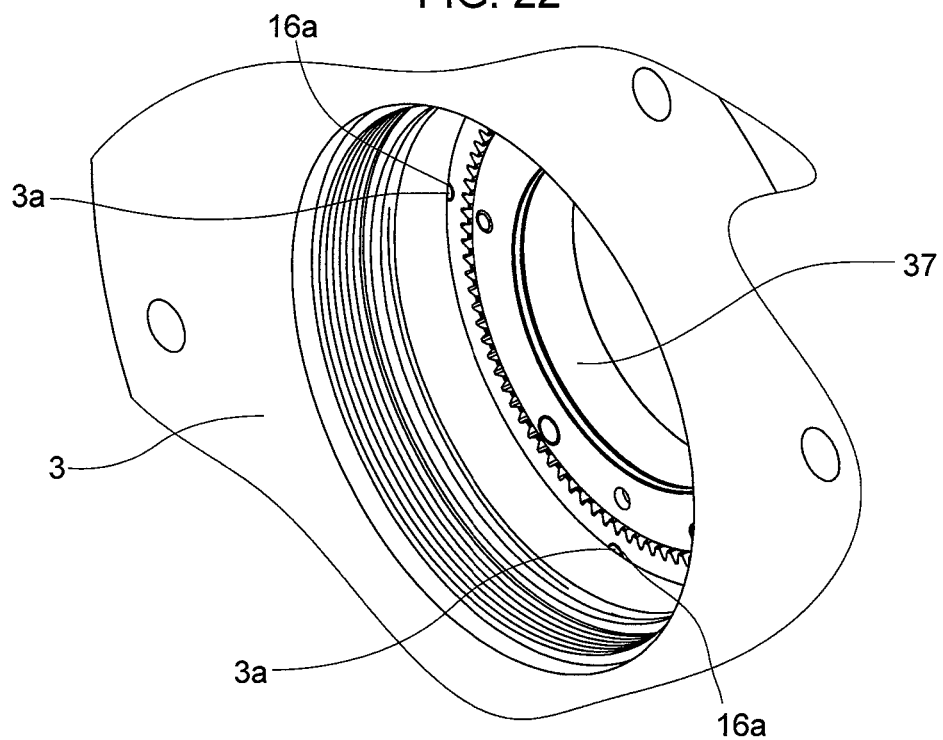
FIG. 23 is a perspective view of the planetary gear subassembly inside of the outer enclosure.

FIG. 22 is an exploded view of the planetary gear subassembly in relation to the outer enclosure, and FIG. 23 is a perspective view of the planetary gear subassembly inside of the outer enclosure. These two figures show how the planetary gear subassembly 37 is situated and secured in place inside the outer enclosure 3. The outer enclosure 3 preferably comprises keys 3a on the inside of the outer enclosure 3 that correspond to slots 16a in the outer ring 16 of the planetary gear subassembly 37. The planetary gear subassembly 37 slides into the outer enclosure 3 as shown, with the keys 3a fitting into the slots 16a.

Figure 24:
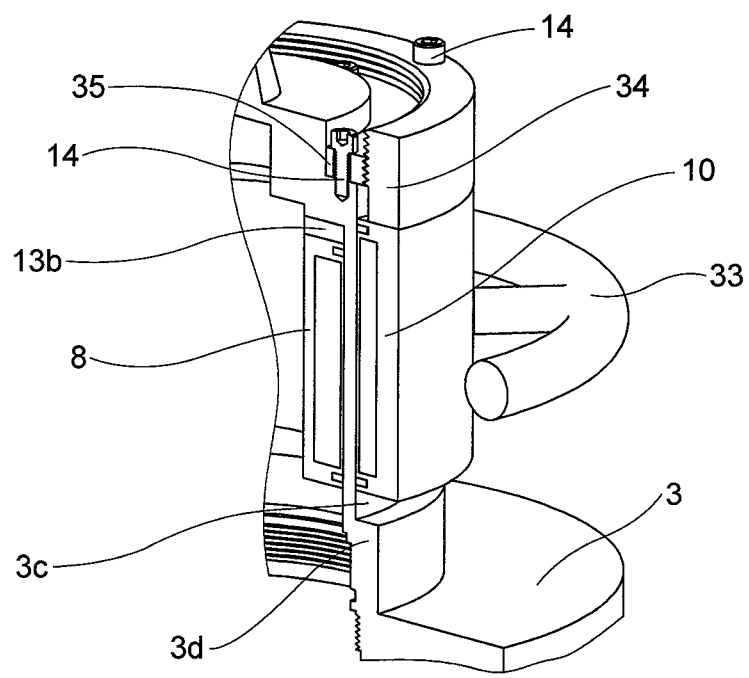
FIG. 24 is a detail section view of the magnetic coupling between the inner and outer magnetic cartridges with the valve in an open position.
Figure 25:
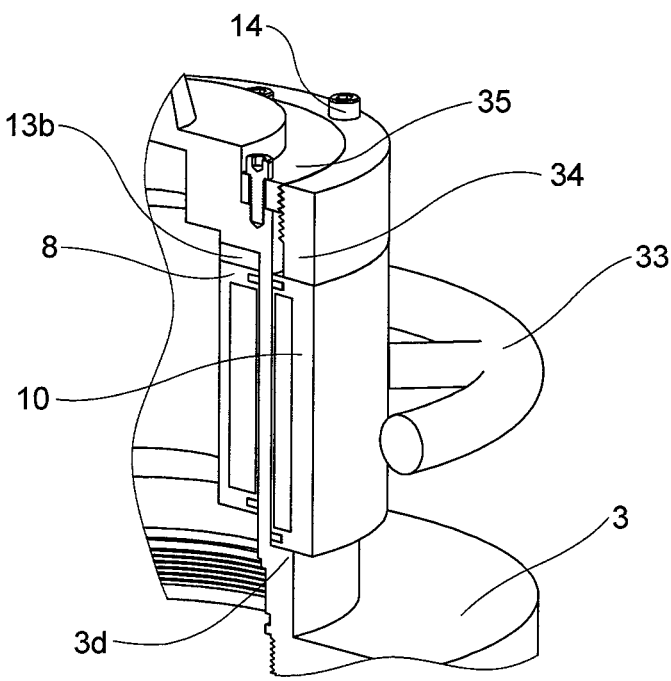
FIG. 25 is a detail section view of the magnetic coupling between the inner and outer magnetic cartridges with the valve in a closed position.

FIG. 24 is a detail section view of the magnetic coupling between the inner and outer magnetic cartridges with the valve in an open position, and FIG. 25 is a detail section view of the magnetic coupling between the inner and outer magnetic cartridges with the valve in a closed position. These figures illustrate the positive stop mechanism of the present invention. The positive stop mechanism comprises a positive stop outer collar 34 and a positive stop inner collar 35. The positive stop inner collar 35 is secured to the outer enclosure 3 with screws 14. The positive stop inner collar 35 comprises external threads that engage with inner threads on the positive stop outer collar 34. Note that the outer diameter of the positive stop outer collar 34 is preferably the same as the outer diameter of the outer magnetic cartridge 10. The positive stop outer collar 34 is situated directly on top of the outer magnetic cartridge 10 and is secured to the outer magnetic cartridge 10 with screws 14.

As the wheel actuator 33 is turned, the outer magnetic cartridge 10 rotates, thereby causing the positive stop outer collar 34 to rotate. Because the internal threads on the positive stop outer collar 34 engage with the external threads on the positive stop inner collar 35, as the positive stop outer collar 34 rotates, it moves up and down relative to the positive stop inner collar 35, thereby causing the outer magnetic cartridge 10 to move up and down relative to the inner magnetic cartridge 8. The outer enclosure 3 comprises a step 3d; note that there is a gap 3c between this step 3d and the outer magnetic cartridge 10 when the valve is in an open position. When the outer magnetic cartridge 10 comes into contact with the step 3d on the outer enclosure 3, the outer magnetic cartridge 10 is prevented from rotating further.

Figure 26:
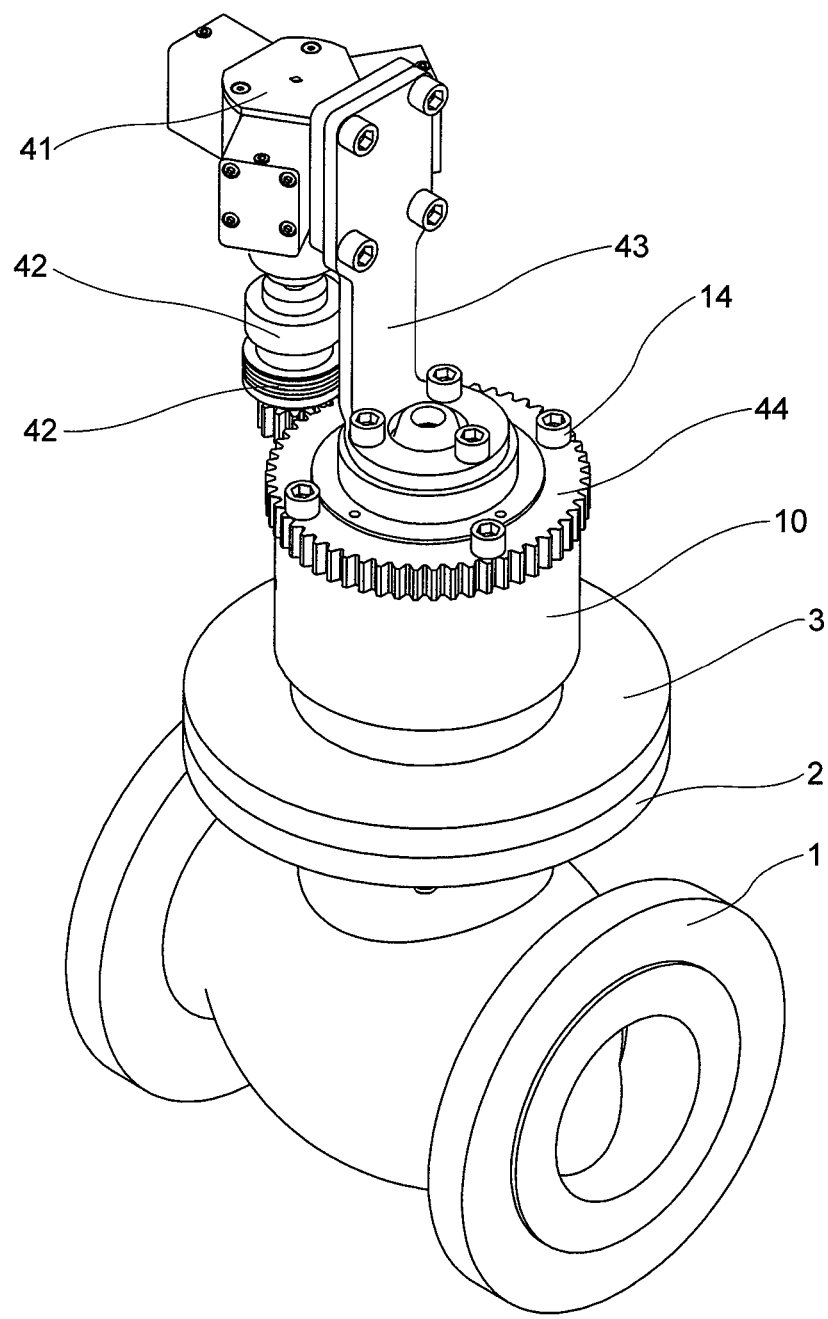
FIG. 26 is a perspective view of the present invention shown with a motorized gear actuation system.

FIG. 26 is a perspective view of the present invention shown with a motorized gear actuation system. In this embodiment, the wheel actuator 33 (not shown) is replaced by a stepper motor 41, which comprises a pneumatic clutch 42 and motor bracket 43. The motor 41 turns an outer gear 44, which is attached to the outer magnetic cartridge 10 with screws 14, thereby causing the outer magnetic cartridge 10 to rotate with the outer gear 44. A motorized actuation system generally provides greater control than a manual actuation system. All other aspects of the invention remain the same as described previously.

Figure 27:
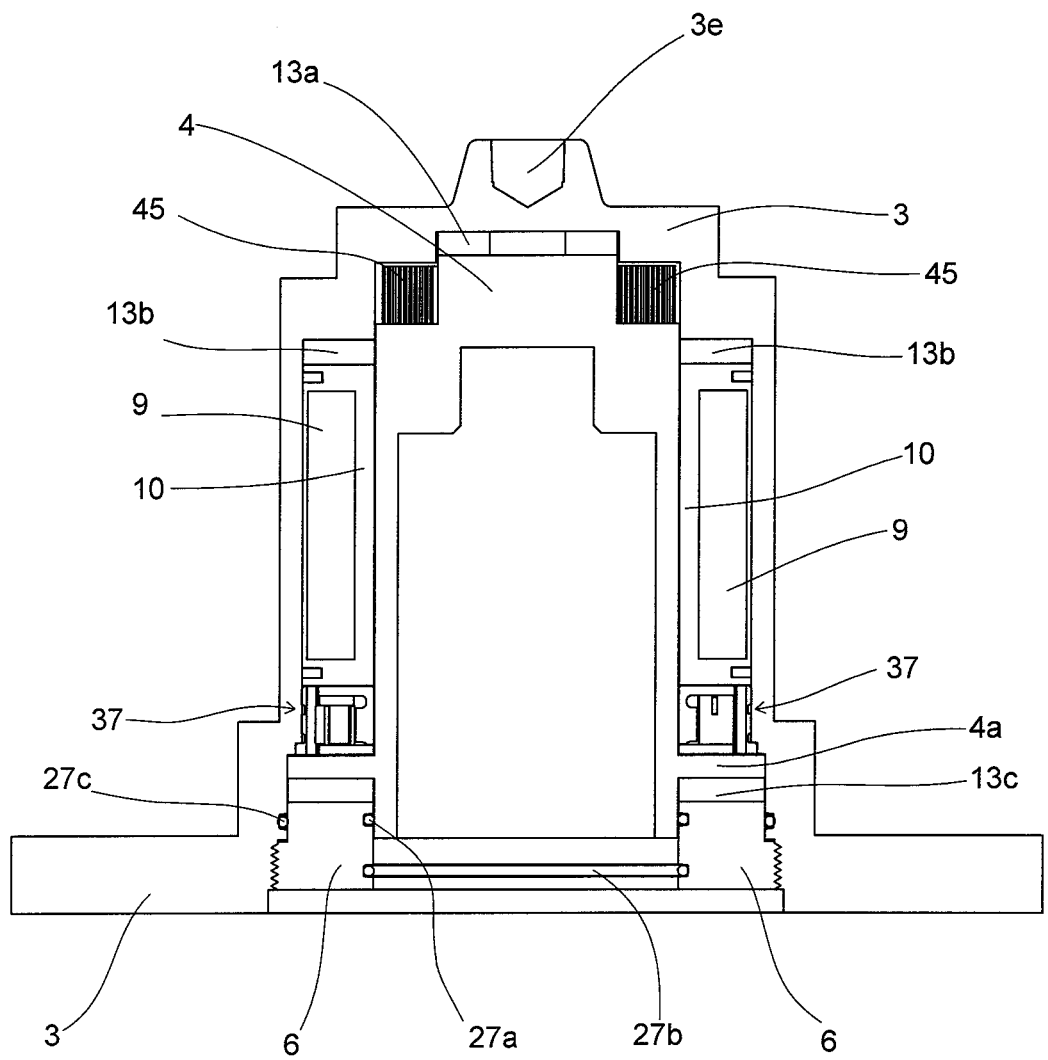
FIG. 27 is a section view of the present invention shown with a motorized gear actuation system illustrating the position of the torsion spring between the inner and outer enclosures.
Figure 28:
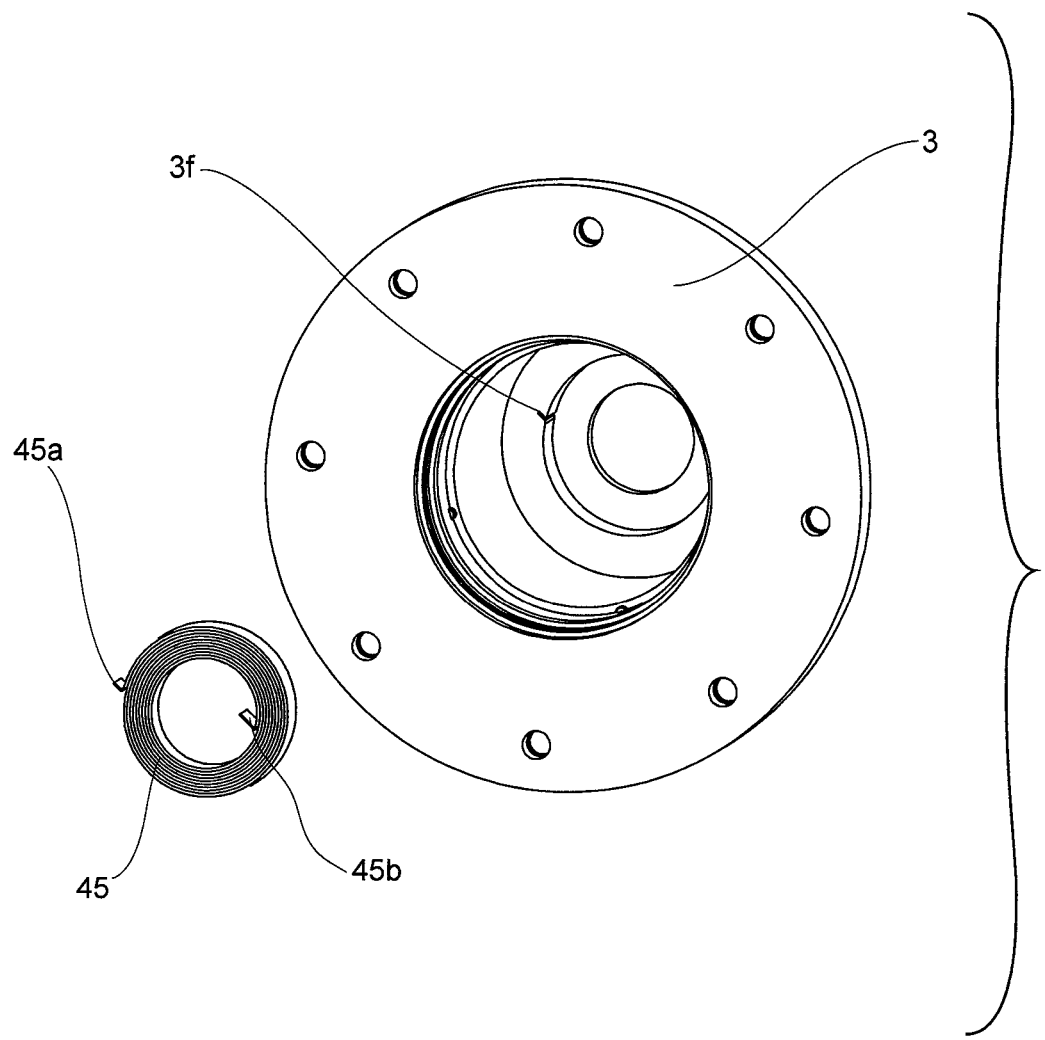
FIG. 28 is a perspective view showing how the torsion spring attaches to the outer enclosure.
Figure 29:
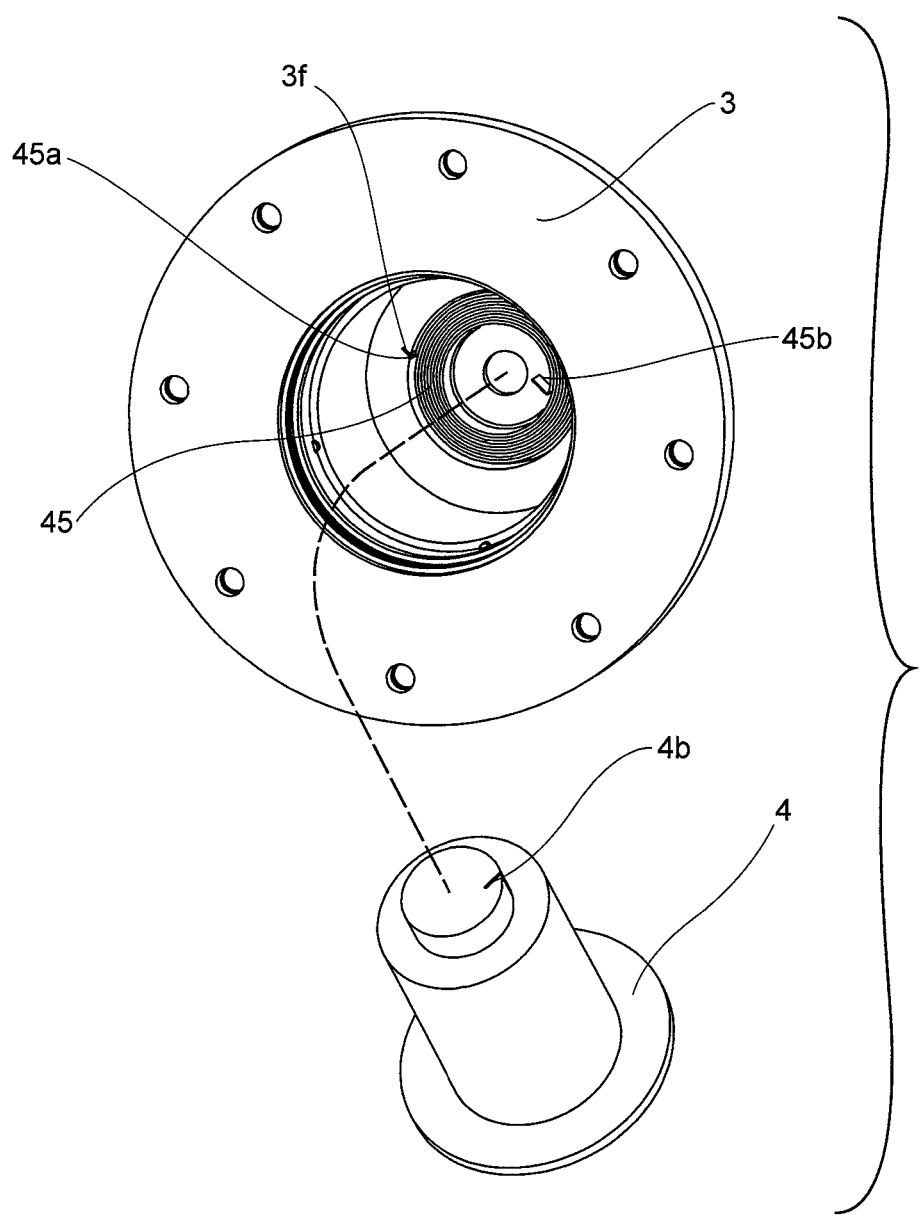
FIG. 29 is a perspective view showing how the torsion spring attaches to the inner enclosure.

FIGS. 27, 28 and 29 show the torsion spring 45 that is used when the valve has a motorized actuation system to ensure that the valve closes upon power failure. As shown in FIG. 27, the torsion spring 45 is positioned between the inner and outer enclosures 4, 3. As shown in FIG. 28, one end 45a of the torsion spring hooks into a slot 3f in the outer enclosure 3, and the other end 45b of the torsion spring hooks into a slot 4b in the inner enclosure 4. During assembly of the valve, the torsion spring 45 is pre-wound so that it always applies a torque between the outer enclosure 3 and the inner enclosure 4. In the event of a power loss to the stepper motor 41, the pneumatic clutch 42 disengages the stepper motor 41 from the outer gear 44 and allows the torsion spring 45 to spin (or rotate) the inner enclosure 4 until the valve is in the closed position. Note that for valves such as pressure relief valves, where the valve must fail to an open position as opposed to a closed position, the torsion spring would be installed so that it opens the valve (rather than closes it) if the drive motor loses power.

Figure 30:
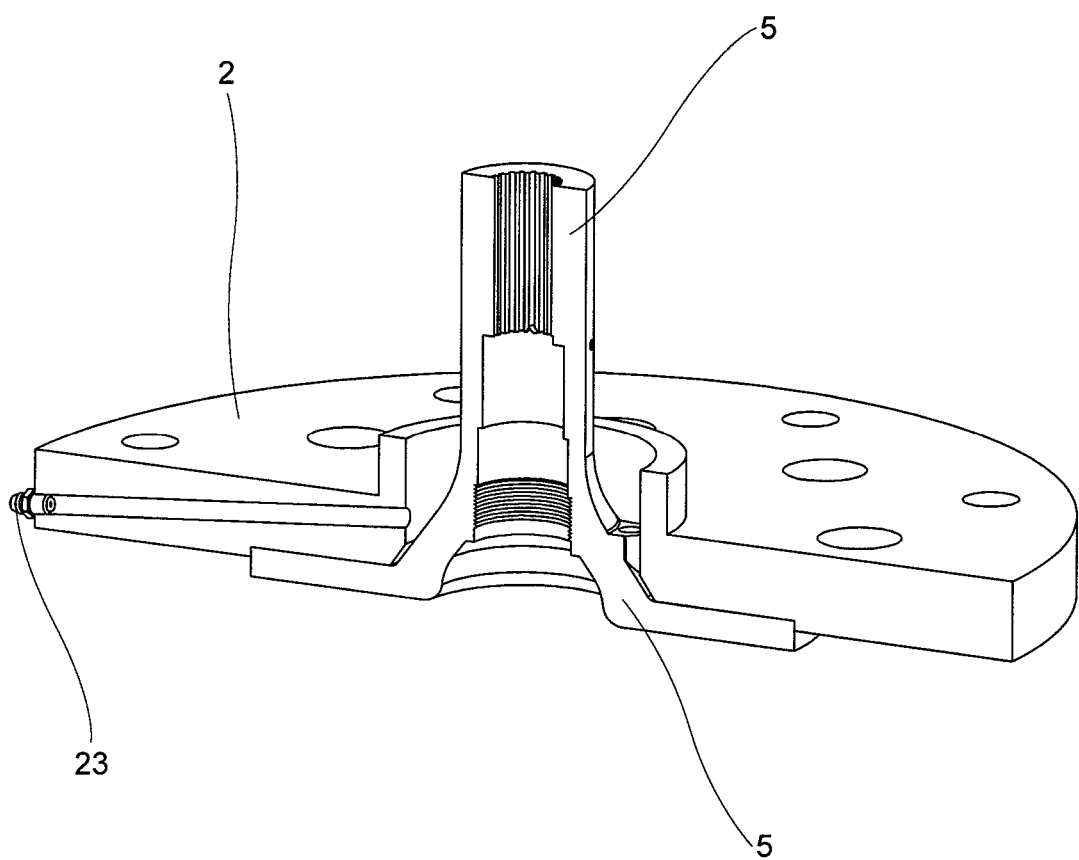
FIG. 30 is a perspective section view of the hole spanning from the grease fitting to the inside edge of the adapter plate.

FIG. 30 shows how the grease fitting 23 is connected to the upper compartment by a drilled hole. This hole allows grease to be added to the inside of the valve without disassembling it.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

REFERENCES

1. Shaw, M., Valve World, Vol. 5, Issue 4 (2000) 32-35.
2. Hathaway, N., Valve World, Vol. 2, Issue 1 (1997) 41.

We claim:

1. A valve assembly comprising:
   (a) an adapter plate assembly comprising an adapter plate, a bonnet with a center and a threaded shaft extending through the center of the bonnet;
   (c) an actuation assembly comprising an outer enclosure and an outer magnetic cartridge that is magnetically coupled to an inner magnetic cartridge; and
   (d) an inner valve assembly comprising an inner enclosure and a planetary gear subassembly comprising one or more planetary gears;
   wherein the outer enclosure is secured to the adapter plate, and the adapter plate is secured to a valve body;
   wherein the valve comprises a plunger that is situated inside of the valve body;
   wherein one end of the threaded shaft comprises external threads, and the other end of the threaded shaft is coupled to the plunger;
   wherein the bonnet comprises a bonnet skirt that is situated on top of the valve body between the valve body and adapter plate;
   wherein the planetary gear subassembly comprises an inner ring that is fixedly attached to the inner magnetic cartridge and an interface disc that is fixedly attached to the inner enclosure, thereby causing the inner enclosure to rotate at a speed slower than that of the inner magnetic cartridge; and
   wherein the outer enclosure prevents any fluids from escaping from the valve.

2. The valve assembly of claim 1, further comprising a retaining ring that holds the inner valve assembly in the outer enclosure.

3. The valve assembly of claim 1, further comprising an internal thread ring that is secured to the inner enclosure inside of the inner enclosure and that is comprised of internal threads that engage with the external threads on the threaded shaft such that when the inner enclosure rotates, the internal thread ring rotates, thereby causing the threaded shaft to move reciprocally within the bonnet.

4. The valve assembly of claim 3, wherein as the threaded shaft reciprocates, it causes the plunger to move reciprocally within the valve body, thereby opening and closing the valve.

5. The valve assembly of claim 3, wherein spline ridges on the threaded shaft and spline grooves inside of the bonnet prevent the threaded shaft from rotating when the internal thread ring rotates.

6. The valve assembly of claim 3, wherein there is an area on top of the threaded shaft between the inner enclosure and threaded shaft into which the threaded shaft moves, and wherein the internal thread ring has a top surface with at least one channel that allows fluid to escape the area on top of the threaded shaft when the threaded shaft moves into that area.

7. The valve assembly of claim 1, further comprising a back seat that surrounds the threaded shaft and holds packing and a piston spring inside of the bonnet and surrounding the threaded shaft.

8. The valve assembly of claim 7, wherein the bonnet comprises at least one weep hole that allows fluid to flow from outside of the bonnet to inside of the bonnet, thereby compressing the piston spring.

9. The valve assembly of claim 1, further comprising a pressure relief valve situated on the bonnet skirt that allows fluid to flow from above the bonnet skirt to below the bonnet skirt and into the valve body.

10. The valve assembly of claim 1, wherein the actuation assembly comprises a motor, the valve assembly further comprising a torsion spring having two ends, wherein the torsion spring is positioned between the inner and outer enclosures with one end of the torsion spring secured to the inner enclosure and the other end of the torsion spring secured to the outer enclosure, the torsion spring being pre-wound such that it causes the inner enclosure to rotate in the event of a power loss to the motor.

11. The valve assembly of claim 1, further comprising a positive stop inner collar that is secured to the outer enclosure and a positive stop outer collar that is secured to the outer magnetic cartridge, wherein the positive stop inner collar comprises external threads that engage with inner threads on the positive stop outer collar, thereby causing the positive stop outer collar to move up and down relative to the positive stop inner collar and the outer magnetic cartridge to move up and down relative to the outer enclosure as the outer magnetic cartridge rotates, wherein the outer enclosure comprises a step, and wherein the outer magnetic cartridge is prevented from rotating further when it comes into contact with the step on the outer enclosure.

* * * * *